(12) United States Patent  (10) Patent No.: US 8,599,756 B2
Yamada  (45) Date of Patent: Dec. 3, 2013

(54) COMMUNICATION RELAY DEVICE, COMMUNICATION RELAY METHOD, AND STORAGE MEDIUM HAVING COMMUNICATION RELAY PROGRAM STORED THEREIN

(75) Inventor: Daisuke Yamada, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 348 days.

(21) Appl. No.: 13/071,518

(22) Filed: Mar. 25, 2011

(65) Prior Publication Data
US 2011/0235502 A1    Sep. 29, 2011

(30) Foreign Application Priority Data

Mar. 29, 2010   (JP) ................................. 2010-074535

(51) Int. Cl.
    *H04W 4/00*    (2009.01)
(52) U.S. Cl.
    USPC ......................................................... 370/328
(58) Field of Classification Search
    None
    See application file for complete search history.

(56) References Cited

U.S. PATENT DOCUMENTS

| 7,769,837 B2* | 8/2010 | Nogawa et al. ............... 709/222 |
| 2009/0213730 A1* | 8/2009 | Zeng et al. ..................... 370/217 |
| 2011/0103255 A1* | 5/2011 | Ikeda et al. .................... 370/252 |

FOREIGN PATENT DOCUMENTS

| JP | 4053308 B | 8/2003 |
| JP | 2008-187603 A | 8/2008 |

* cited by examiner

*Primary Examiner* — Anh-Vu Ly
(74) *Attorney, Agent, or Firm* — Oblon, Spivak, McClelland, Maier & Neustadt, L.L.P.

(57) ABSTRACT

A relay device performing wireless communication with a wireless communication device to relay communication between the wireless communication device and another communication device. First and second relay modes of the relay device each include a set of communication parameters for relaying communication via respective first and second communication paths. The relay device includes a communication failure determination section for determining, whether there is a communication failure in the first communication path, and a relay mode controlling section for enabling the first relay mode and disenabling the second relay mode when there is no communication failure in the first communication path, and disenabling the first relay mode and enabling the second relay mode when there is a communication failure in the first communication path. A communication control section controls communication based on either the first relay mode or the second relay mode that is enabled by the relay mode controlling section.

11 Claims, 18 Drawing Sheets

FIG.3

| RELAY MODE | | FIRST RELAY MODE | SECOND RELAY MODE 310 |
|---|---|---|---|
| SSID | HOST | SSID1 | SSID2 |
| | LINK INTEGRITY STATE | AUTHORIZATION SERVER 802 NORMALLY ENABLED | NORMALLY DISENABLED |
| SECURITY METHOD | | WPA2-EAP | WPA2-PSK |
| WPA2-PSK (PRE-SHARED KEY) | | N/A | ********** |
| RADIUS SERVER | | SERVER 802 | N/A |
| VLAN | | 1 (INTERNAL NETWORK) | 2 (EXTERNAL NETWORK) |
| MAXIMUM NUMBER OF CONNECTIONS | | 10 | UNLIMITED |
| : | | : | : |

FIG. 16

| RELAY MODE | | FIRST RELAY MODE | SECOND RELAY MODE |
|---|---|---|---|
| SUBNET CONFIGURATION | | N/A | ROUTER TO PROVIDER NETWORK 620 |
| HOST | | GATEWAY 612 | |
| STATE | | NORMALLY ENABLED | NORMALLY DISENABLED |
| LINK INTEGRITY | DHCP | DISABLED | ENABLED |
| | UPNP | DISABLED | ENABLED |
| | RIP | DISABLED | ENABLED |
| | ⋮ | ⋮ | ⋮ |

310D

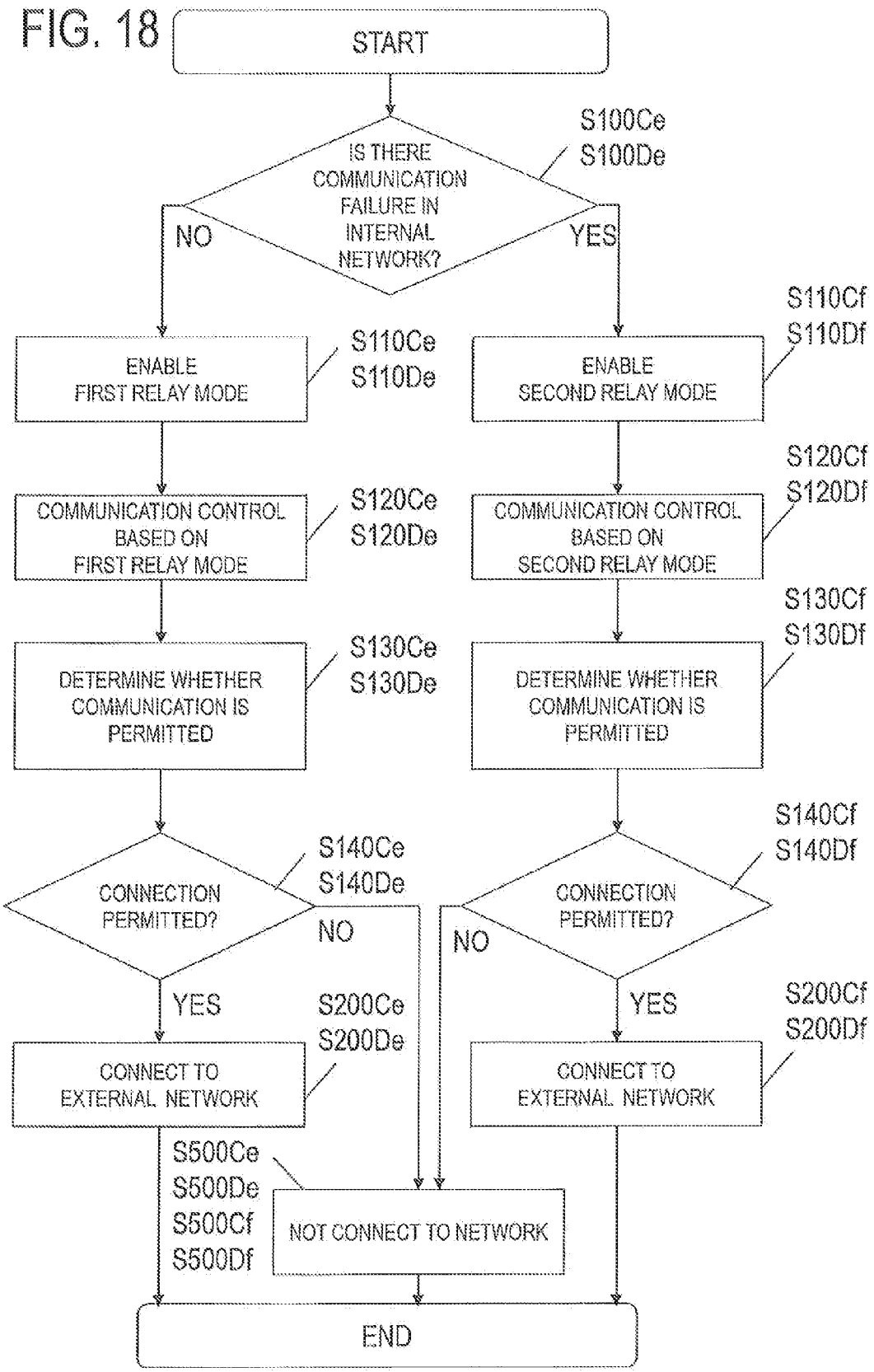

COMMUNICATION RELAY DEVICE, COMMUNICATION RELAY METHOD, AND STORAGE MEDIUM HAVING COMMUNICATION RELAY PROGRAM STORED THEREIN

CROSS REFERENCE TO RELATED APPLICATION

The disclosure of Japanese Patent Application No. 2010-074535, filed on Mar. 29, 2010, is incorporated herein by reference.

BACKGROUND OF THE INVENTION

1. Field of the Invention

The present invention relates to a communication relay device, a communication relay method, and a storage medium having a communication relay program stored therein.

2. Description of the Background Art

Wireless LAN access points used in offices are required to have a function of allowing stations establishing connections with the access points to continuously access the intra-office networks even in the case of network communication path failure or when the authentication server is down. As such a function, for example, Japanese Patent No. 4053308 discloses a link integrity function. According to this function, if it is determined that a specific communication path leading to an access point has failure, the access point stops the communication function. Accordingly, stations connected to the access point attempt to connect to another access point (secondary access point) to continue communication.

However, if a station cannot find a secondary access point employing the link integrity, the station cannot establish a connection with the network. Further, when the station establishes a connection to the secondary access point, the manager of the station needs to set communication parameters on the station to establish the connection with the secondary access point.

An object of the present invention is to provide a technique of allowing a station to continuously establish a connection to an access point, and of causing, in order to reduce loads on the manager of the station, the access point to manage communication parameters relating to a plurality of communication paths so that the access point autonomously changes communication settings to correspond to the communication path that has no communication failure.

SUMMARY OF THE INVENTION

A first aspect of the present invention is a relay device for performing wireless communication with a wireless communication device to relay communication between the wireless communication, device and another communication device. The relay device includes: a communication interface connectable to at least two communication paths; a wireless interface for wireless communication between the wireless communication device and the relay device; a relay mode storing section for storing a first relay mode which includes a first set of communication parameters for relaying, via a first one of the communication paths, the communication using the communication interface, and a second relay mode which includes a second set of communication parameters for relaying, via a second one of the communication paths which is different from the first communication path, the communication using the communication interface; a communication failure determination section for determining whether there is a communication failure in the first communication path; a relay mode controlling section for enabling the first relay mode and disenabling the second relay mode when the communication failure determination section determines that there is no communication failure in the first communication path, and disenabling the first relay mode and enabling the second relay mode when the communication failure determination section determines that there is a communication failure occur in the first communication path; and a communication control section for controlling the communication based on either the first relay mode or the second relay mode that is enabled by the relay mode controlling section.

In a further aspect, the relay device further may include a relay mode setting section configured to set values specifying the first one and the second one of the communication paths and the first and second sets of communication-parameters of the respective first relay mode and second relay modes, and to store the set values and the first and second sets of communication parameters in the relay mode storing section.

In a further aspect, the first relay mode includes a first wireless identifier, as one of the first set of communication parameters, used for identifying a wireless network established by the wireless interface, the second relay mode includes a second wireless identifier, as one of the second set of communication parameters, which is different from the first wireless identifier. The communication control section may include: a wireless network control section for causing the wireless interface to establish communication with the wireless network identified by the first wireless identifier when the first relay mode is enabled, and for causing the wireless interface to establish communication with the wireless network identified by the second wireless identifier when the second relay mode is enabled.

In a further aspect, the first communication path may include a communication path leading to a determination server which performs permissible connection determination of whether the relay to the wireless communication device is permissible, the first relay mode includes, as one of the first set of communication parameters, a setting for enabling the permissible connection determination by the determination server, the second relay mode includes as one of the second set of communication parameters, a setting for enabling the permissible connection determination by the relay device; and the communication control section includes a permissible connection determination section for inquiring of the determination server and for performing the permissible connection determination based on a result of the inquiry when the first relay mode is enabled, and for performing the permissible connection determination singly when the second relay mode is enabled.

In a further aspect, the first relay mode and the second relay mode each include, as one of the respective first and second sets of communication parameters, a virtual network identifier for identifying a virtual network established using a communication line connected to the communication interface is configured to establish connection. The virtual network identifier of the first relay mode is a first virtual network identifier for identifying a first virtual network including the first communication path, the virtual network identifier of the second relay mode is a second virtual network identifier for identifying a second virtual network including the second communication path. The communication control section is configured to perform the relay using the first virtual network when the first relay mode is enabled, and to perform the relay using the second virtual network when the second relay mode is enabled.

In a further aspect, in the second communication path, a subsequent relay device configured to relay the communication subsequently to the relay device is wirelessly connected to the relay device. The communication interface has a second wireless interface for the wireless communication, the communication control section includes a wireless relaying section which relays the communication without using the subsequent relay device when the first relay mode is enabled, and which relays the communication via the subsequent, relay device when the second relay mode is enabled.

In a further aspect, the communication control section may be configured to perform the communication via the first communication path based on a network layer header of a communication frame, and perform the communication via the second communication path based on a data link layer header of the communication frame, the first relay mode includes as one of the first set of communication parameters a setting for the communication based on the network layer header, the second relay mode includes as one of the second set of communication parameters a setting for the communication based on the data link layer header.

In a further aspect, the first relay mode may include as one of the first set of communication parameters a setting for enabling address allocation in accordance with a dynamic host configuration protocol, and the second relay mode includes as one of the second set of communication parameters a setting for disenabling the address allocation in accordance with the dynamic host configuration protocol.

A second aspect of the present invention is a relay method for establishing wireless communication between a relay device and a wireless communication device and relaying communication between the wireless communication device and another communication device. The method includes: a first step of determining whether there is a communication failure in a first communication path; a second; step of enabling a first relay mode which includes a first set of communication parameters for relaying the communication via the first communication path and disenabling a second relay mode which includes a second set of communication parameters for relaying the communication via a second communication path which is different from the first communication path, when the first step determines that there is no communication failure in the first communication path, and disenabling the first relay mode and enabling the second relay mode when the first step determines that there is a communication failure in the first-communication path; and a third step of controlling the communication in accordance with either the first relay mode or the second relay mode that is enabled by the second step.

In a further aspect of the second aspect, the third step of controlling the communication performs performing the communication via the first communication path based on a network layer header of a communication frame, and performs the communication via the second communication path based on a data link layer header of the communication frame. The first relay mode includes as one of the first set of communication parameters a setting for the communication based on the network layer header, and the second relay mode includes as one of the second set of communication parameters a setting for the communication based on the data link layer header.

A third aspect of the present invention is a storage medium having stored therein a program for causing a computer included in a relay device to execute a process of performing wireless communication with a wireless communication device and relaying communication between the wireless communication device and another communication device. The process includes: a first step of determining whether there is a communication failure in a first communication path; a second step of enabling a first relay mode which includes a first set of communication parameters for relaying the communication via the first communication path and disenabling a second relay mode which includes a second set of communication parameters for relaying the communication via a second communication path which is different from the first communication path, when the first step determines that there is no communication failure in the first communication path, and disenabling the first relay mode and enabling the second relay mode when the first step determines that there is a communication failure in the first communication path; and a third step of controlling the communication in accordance with either the first relay mode or the second relay mode that is enabled by the second step.

In a further aspect of the third aspect, the third step of controlling the communication performs the communication via the first communication path based on a network layer header of a communication frame, and performs the communication via the second communication path based on a data link layer header of the communication frame. The first relay mode includes as one of the first set of communication parameters a setting for the communication based on the network layer header, and the second relay mode includes as one of the second set of communication parameters a setting for the communication based on the data link layer header.

The present invention may be realized in various modes, and for example, may be realized in a form of a communication relay method; a communication relay device; a network system including a communication relay device; a computer-readable program realizing the functions of the method or device; a storage medium having the computer-readable program recorded therein; and the like.

The relay device of the present invention manages a first relay mode which includes a set of communication parameters for relaying communication via a first communication path, and a second relay mode which includes a set of communication parameters for relaying communication via a second communication path other than the first communication path. The relay device relays the communication based on the first relay mode when there is no communication failure in the first communication path, and relays the communication based on the second relay mode when there is a communication failure in the first communication path. Thus, a station connected to the relay device can continuously be connected the network, and accordingly, it is possible to reduce loads on the manager of the station.

BRIEF DESCRIPTION OF THE DRAWINGS

FIG. 3 is an explanatory diagram illustrating an example of information stored in a relay mode storing section;

FIG. 16 is an explanatory; diagram illustrating an example of information stored in a relay mode storing section 310D of a second relay device;

FIG. 18 is a flowchart showing a flow of operation of the relay device according to the third embodiment.

DESCRIPTION OF THE PREFERRED EMBODIMENTS

First Embodiment

Figure 1:
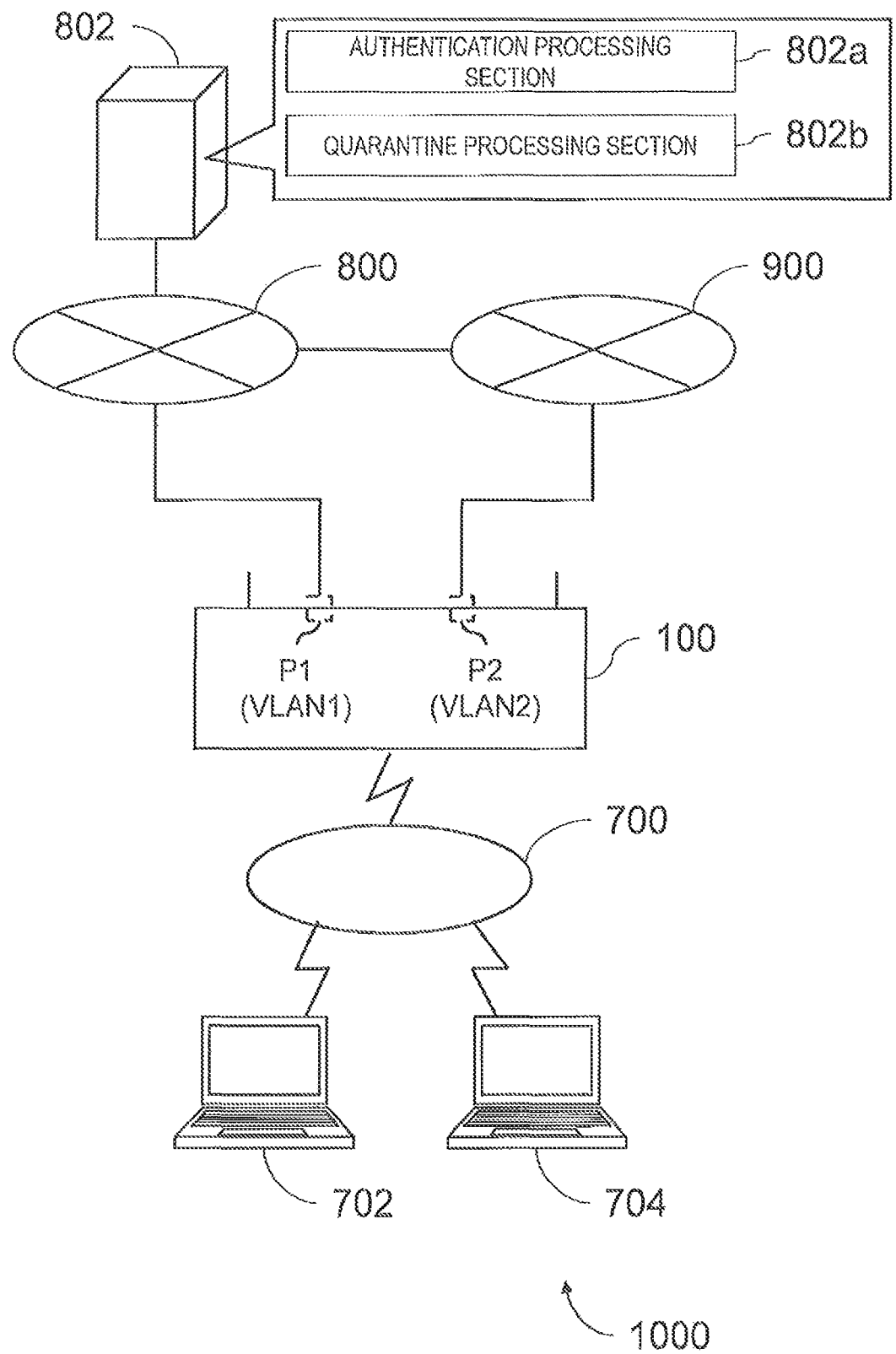
FIG. 1 is an explanatory diagram illustrating a network system according to a first embodiment of the present invention.

FIG. 1 is an explanatory diagram illustrating a network system 1000 according to a first embodiment of the present invention. The network system 1000 includes a relay device 100, an internal network 800 connected to a first port P1 of the relay device 100, an authentication server 802 connected to the internal network 800, an outside network 900 connected to a second port P2 of the relay device 100, and stations 702 and 704 connected to the relay device 100 by means of wireless communication. The relay device 100 and the stations 702 and 704 are each a wireless LAN communication device compliant with the IEEE802.11 standard.

In this embodiment, the internal network 800 is a network (e.g. intranetwork) configured within a limited range, whereas the outside network 900 is an outside network (e.g., the Internet) configured without limitation of range. In this embodiment, the internal network 800 is also connected to the outside network 900.

The relay device 100 is an access point. The relay device 100 utilizes a wireless network 700 compliant with the IEEE802.11 standard to perform wireless communication with the stations 702 and 704. The stations 702 and 704 are arbitrary communication devices capable of performing wireless communication (e.g., the stations 702 and 704 are personal computers). The communication devices connected to the wireless network 700 are not limited to computers, but may be any other type of device (e.g., home electrical appliances such as televisions, video cameras, and video recorders).

The authentication server 802 is a so-called Remote Authentication Dial In User Service (RADIUS) server. The authentication server 802 is used for determination of whether connection (communication relay), of a station to the network via the relay device 100 is permissible (the determination is also referred to as "permissible connection determination"). In this embodiment, the authentication server 802 includes an authentication processing section 802a for performing Wi-Fi Protected Access 2—Extensible Authentication Protocol (WPA2-EAP compliant with the IEEE802.11i) authentication.

The relay device 100 performs the permissible connection determination in response to a request from the station (e.g., station 702). In this case, the relay device 100 inquires of the authentication server 802 about the determination result. The station and the authentication server 802 exchange various pieces of data (e.g., so-called challenge and response, and certification data) via the relay device 100. The authentication server 802 (authentication processing section 802a) authenticates the station using the received data to determine whether to permit connection (communication relay) of the station to the network. The authentication server 802 (authentication processing section 802a) transmits the determination result to the relay device 100. The relay device 100 permits or rejects connection (communication relay) of the station to the network in accordance with the received determination result. There are a plurality of types of authentication methods using the EAP (e.g., an EAP-TLS (Transport Layer Security), an EAP-TTLS (Tunneled TLS), an EAP-PEAP (Protected EAP)), and the authentication processing section 802a may apply any of such authentication methods.

Further, the authentication server 802 includes a quarantine processing section 802b. The quarantine processing section 802b has a function of quarantining wireless communication devices connected to the internal network 800 via the relay device 100. In this embodiment, the authentication server 802 employs the following requirements for permitting a station to connect to the network. That is, the requirements are that the station is authenticated by the authentication process, and that the current status of the station satisfies a predetermined quarantine condition. Examples of a predetermined quarantine condition are that "the station has installed antivirus software of a certain version or later", that "the station has not installed a specific software (e.g., specific file exchange software)", and the like. The quarantine processing section 802b utilizes data received from the station via the relay device 100 to determine whether the station satisfies the quarantine condition.

The station (e.g., station 702) has an information transmitting section (not illustrated). The information transmitting section transmits, to the authentication server 802 via the relay device 100, information to be used for authentication by the authentication processing section 802a. The information transmitting section is also referred to as a "supplicant". In this embodiment, the information transmitting section also transmits, to the authentication server 802 via the relay device 100, data to be used by the quarantine processing section 802b.

The authentication processing section 802a and the quarantine processing section 802b are realized by a computer (not illustrated). Further, a server other than the authentication server 802 may include the quarantine processing section 802b and may operate in concert with the authentication server 802.

The relay device 100 can perform permissible connection determination without inquiring the authentication server 802. For example, a WPA-PSK (pre-shared key) method or a WPA2-PSK method may be employed for the permissible connection determination. These determination methods are used when the station cannot access the authentication server 802 (details to be described later).

If the relay device 100 permits connection (communication relay), the station (e.g., station 702) is able to connect to the internal network 800 via the relay device 100. Accordingly, the station can utilize various services (e.g., Web service and mail service) using the internal network 800.

Normally, the relay device 100 does not perform communication relay to/from the outside network 900. In an embodiment, the communication relay to/from the outside network 900 may be performed when, for example, a communication failure occurs in the communication path used for access from the relay device 100 to the internal network 800 (details to be described later).

Figure 2:
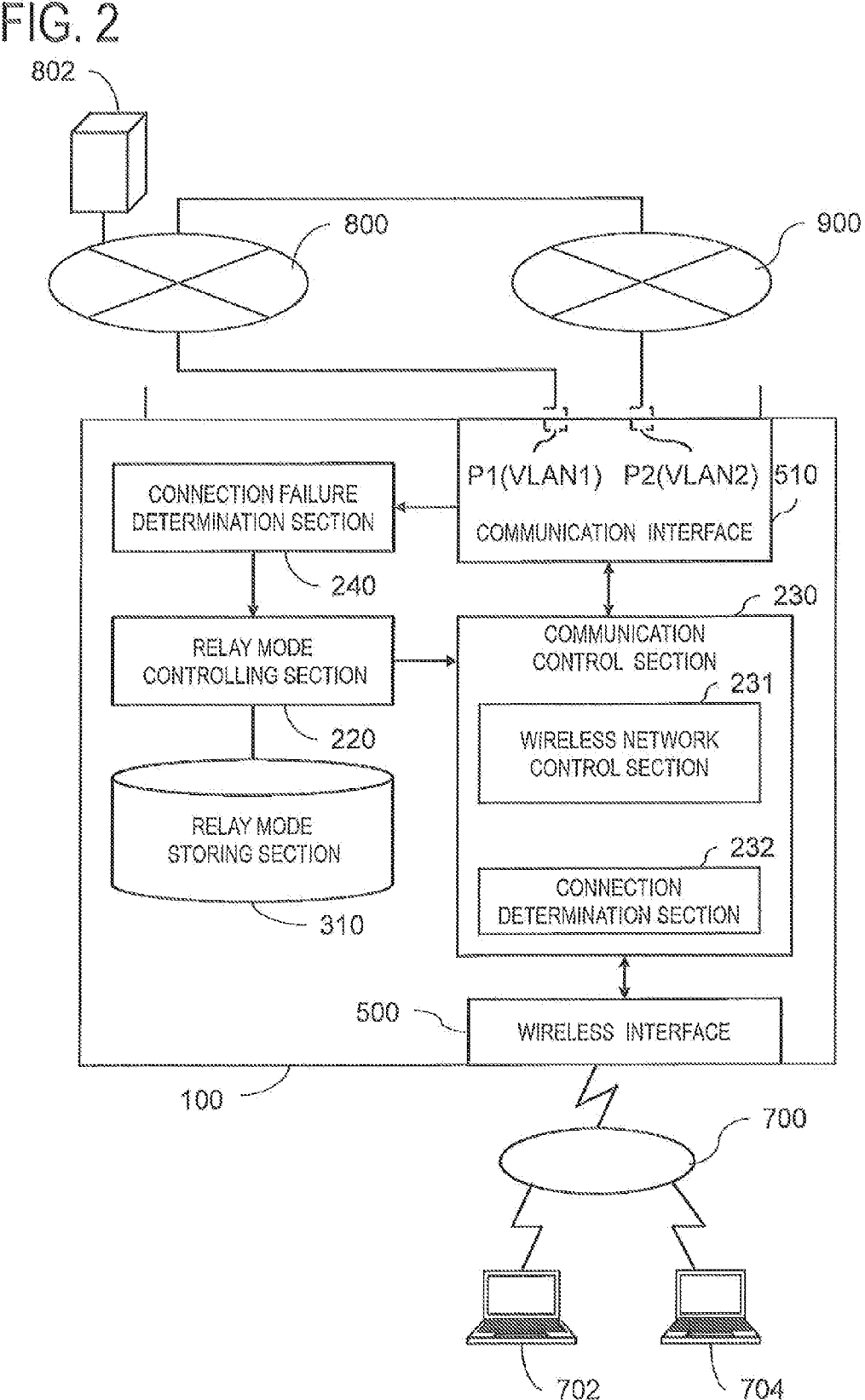
FIG. 2 is a block diagram illustrating a configuration of a relay device according to the first embodiment.

FIG. 2 is a block diagram illustrating a configuration of the relay device 100. The relay device 100 includes a wireless interface 500 for wireless communication, a communication interface 510 for communication with the internal network 800 and for communication with the outside network 900, a communication failure determination section 240, a relay mode controlling section 220, a relay mode storing section 310, and a communication control section 230.

The wireless interface 500 performs communication using the wireless network 700 compliant with the IEEE802.11. Any of IEEE802.11 a, b, g, and n may be alternatively adopted as the standard of the wireless network 700. Alternatively, any other standard than the IEEE802.11 may be adopted.

The communication interface 510 is, for example, an interface for establishing connection with a communication line compliant with the IEEE802.3. As illustrated in FIG. 2, in this embodiment, the communication interface 510 has two ports P1 and P2, and the internal network 800 is connected to the first port P1, and the outside network 900 is connected to the second port P2. The number of ports arranged in the communication interface 510 may be one, or three or more. Further, any other standard than the IEEE802.3 may be adopted as the standard of the communication network. For example, power line communication (PLC) may be adopted. Alternatively, instead of the interface for wired communication, an interface for wireless communication may be adopted.

The communication control section 230 controls communication between communication devices (e.g., station 702 and other relay devices not illustrated) which are connected to the interfaces (wireless interface 500 and communication interface 510) for communication. Here to "control communication" means various communication-related controls, and has a wide-ranging concept including not only data communication relay but also permissible connection determination. Further, to "control communication using a specific communication path" means that at least some of various communication-related controls are performed using a specific communication path. For example, data may be relayed through the specific communication path. Alternatively, instead of using the specific communication path to relay data, the authentication server connected to the specific communication path may be used for permissible connection determination. Both of the wireless interface 500 and the communication interface 510 are communication path interfaces for establishing a connection with a plurality of communication paths. For example, the wireless interface 500 establishes a connection with a communication path leading to the station 702, and the communication interface 510 establishes a connection with a communication path leading to the internal network 800.

The communication control section 230 realizes a so-called routing function (function of routers or layer 3 switches) to relay communication. Information (e.g., routing table) for performing the routing function is stored in a non-volatile memory (not illustrated) managed by the communication control section 230. The communication control section 230 may realize other, functions (e.g., a so-called bridging function (layer 2 switch function)) for communication relay instead of the routing function. In addition, the relay execution section 230 may operate as a mere repeater. The layer 2 corresponds to the second layer (data link layer), and the layer 3 corresponds to the third layer (network layer) of the so-called Open Systems Interconnection (OSI) reference model.

A permissible connection determination section 232 of the communication control section 230 performs permissible connection determination as a part of the communication control. The permissible connection determination section 232 may perform the determination utilizing the authentication server 802. Alternatively, the permissible connection determination section 232 may perform the determination singly without utilizing the authentication server 802.

A wireless network control section 231 of the communication control section 230 controls the wireless interface 500 as a part of the communication control. Accordingly, the relay device 100 can establish the wireless network 700 using wireless communication. For example, the wireless network control section 231 sets a so-called Service Set Identifier (SSID) to perform communication with a station having set thereto the same SSID. The SSID is used for identification of the wireless network 700.

The relay mode controlling section 220 selects from first and second relay modes which are stored in the relay mode storing section 310 to be described later, a relay mode to be enabled. As will be described later, in this embodiment, the relay mode controlling section 220 switches the relay mode to be enabled in accordance with the determination result by the communication failure determination section 240. The communication failure determination section 240 determines whether a communication failure has occurred in a specific communication path. The specific communication path represents a communication path which is set, by the relay mode storing section 310, to be used for the first relay mode.

In this embodiment, the communication failure determination section 240 determines whether a communication failure has occurred in a preliminarily set target host (target communication device) using an echo request packet of an Internet Control Message Protocol (ICMP). If it is determined that there is no communication failure, the target host transmits an echo reply packet to the relay device 100. If there is a communication failure, the relay device 100 cannot receive the echo reply packet. Further, when a high load is imposed on the communication path, even in the case of no communication failure, a packet may be partially broken by a network device such as a switch. Thus, the communication failure determination section 240 transmits an echo request repeatedly at predetermined intervals (e.g., 2 sec). When the communication failure determination section 240 transmits an echo request N consecutive times (N is an integer of one or more, e.g., 5), but does not receive an echo reply, the communication failure determination section 240 determines that an communication failure has occurred. The predetermined interval and the N times may be set by the user. The ICMP echo request is not the only method usable as the method for checking link integrity, but any other method may be adopted.

FIG. 3 is an explanatory diagram illustrating an example of information stored in the relay mode storing section 310. In this embodiment, two relay modes, i.e., the first relay mode and the second relay mode are set. With respect to each relay mode, a plurality of items are set which include the SSID, a target host whose link integrity is to be checked by the communication failure determination section 240, a state determined by the link integrity checking, a security method, the WPA2-PSK (pre-shared key), a RADIUS server, a VLAN, and a maximum number of connections.

The SSID (Service Set Identifier) is an identifier identifying the wireless network 700. In this embodiment, this setting item indicates a so-called ESSID (Extended Service Set Identifier). In this embodiment, the SSID of the first relay mode is set as an "SSID1", and the SSID of the second relay mode is set as an "SSID2". This setting item may be a so-called BSSID (Basic Service Set Identifier).

The target host whose link integrity is to be checked represents a target host whose connection is checked by the communication, failure determination section 240. In this embodiment, the host is the authentication server 802 illustrated in FIG. 1. Since the authentication server 802 is connected to the internal network 800, checking of connection to the authentication server 802 also represents checking of connection to the internal network 800. In another example, to check whether a certain communication path has a communication failure, any communication device connected to a network on the communication path can be adopted as the target host. For example, to check connection to a certain network, any communication device connected to the network can be adopted as a target host.

The link integrity checking determines whether the state of the common path is either "normally enabled (up on operation)" and "normally disenabled (down on operation)". The normally enabled state is a state in which the communication path is enabled when there is no communication failure, and is disenabled when a communication failure has; occurred. The normally disenabled state represents the converse; that is, the communication path is disenabled when there is no communication failure, and is enabled when a communication failure has occurred. In this embodiment, the state of the first relay mode is set as the normally enabled state, whereas the state of the second relay mode is set as the normally disenabled state.

The security method represents the permissible connection determination method. In this embodiment the security method of the first relay mode is set as the "WPA2-EAP", whereas the security method of the second relay mode is set as the "WPA2-PSK".

The pre-shared key is used for the WPA2-PSK method. In this embodiment, the pre-shared key is set for the second relay mode. No pre-shared key is set for the first relay mode.

The RADIUS server is used for the WPA2-EAP method. In this embodiment, the RADIUS server is set to the authentication server 802 in the first relay mode. In the second relay mode, no RADIUS server is set.

The "VLAN" represents an identifier of a virtual LAN associated with a wireless network (also referred to as "VLAN-ID"). The virtual LAN represents a group of one or more ports which are mutually communicable at the layer 2 level. In this embodiment, the VLAN-ID of the first relay mode; is set as the "first virtual LAN (VLAN1)", and the VLAN-ID of the second relay mode is set as the "second virtual LAN (VLAN2)".

The "maximum number of connections" indicates the maximum number of stations connectable via the wireless interface 500. In this embodiment, the maximum number of the first relay mode is set to "10", whereas the maximum number of the second relay mode is set to "unlimited". The relay device 100 rejects connection of a communication device when the number of connections exceeds the maximum number of connections.

Figure 4:
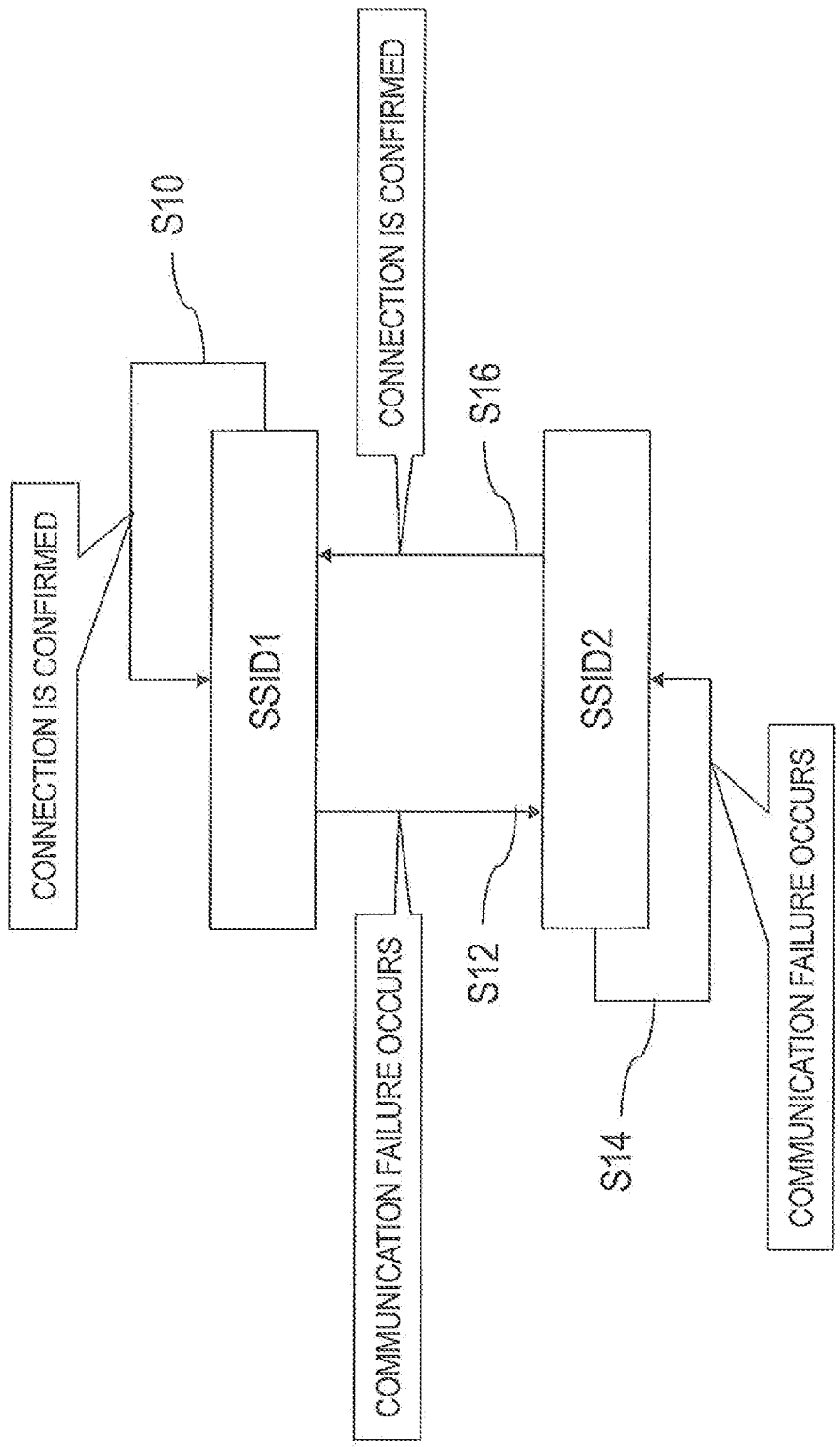
FIG. 4 is a state transition diagram illustrating transition between a first relay mode and a second relay mode in the first embodiment.

FIG. 4 is a state transition diagram indicating transition between the two relay modes in this embodiment. When connection with the target host is being confirmed, the relay mode controlling section 220 maintains a state where the first relay mode (SSID1) is enabled (step S10). Accordingly, the communication control section 230 controls communication based on the first relay mode. Under this state, if the communication failure determination section 240 determines that a communication failure has occurred, the relay mode controlling section 220 disenables the first relay mode (SSID1), and enables the second relay mode (SSID2) (step S12). Accordingly, the communication control section 230 discontinues communication control based on the first relay mode, and starts communication control based on the second relay mode. In the second relay mode, if the communication failure determination section 240 still cannot confirm connection with the target host (if communication failure cannot be solved), the relay mode controlling section 220 maintains the state where the second relay mode (SSID2) is enabled (step S14). Accordingly, the communication control section 230 continues the communication control based on the second relay mode. In the second relay mode, if the communication failure determination section 240 determines that connection with the target host is confirmed, the relay mode controlling section 220 disenables the second relay mode (SSID2), and enables the first relay mode (SSID1) (step S16). Accordingly, the communication control section 230 discontinues the communication control based on the second relay mode, and starts communication control based on the first relay mode. As described above, the relay mode controlling section 220 automatically switches the relay mode in accordance with the determination result made by the communication failure determination section 240.

Figure 5:
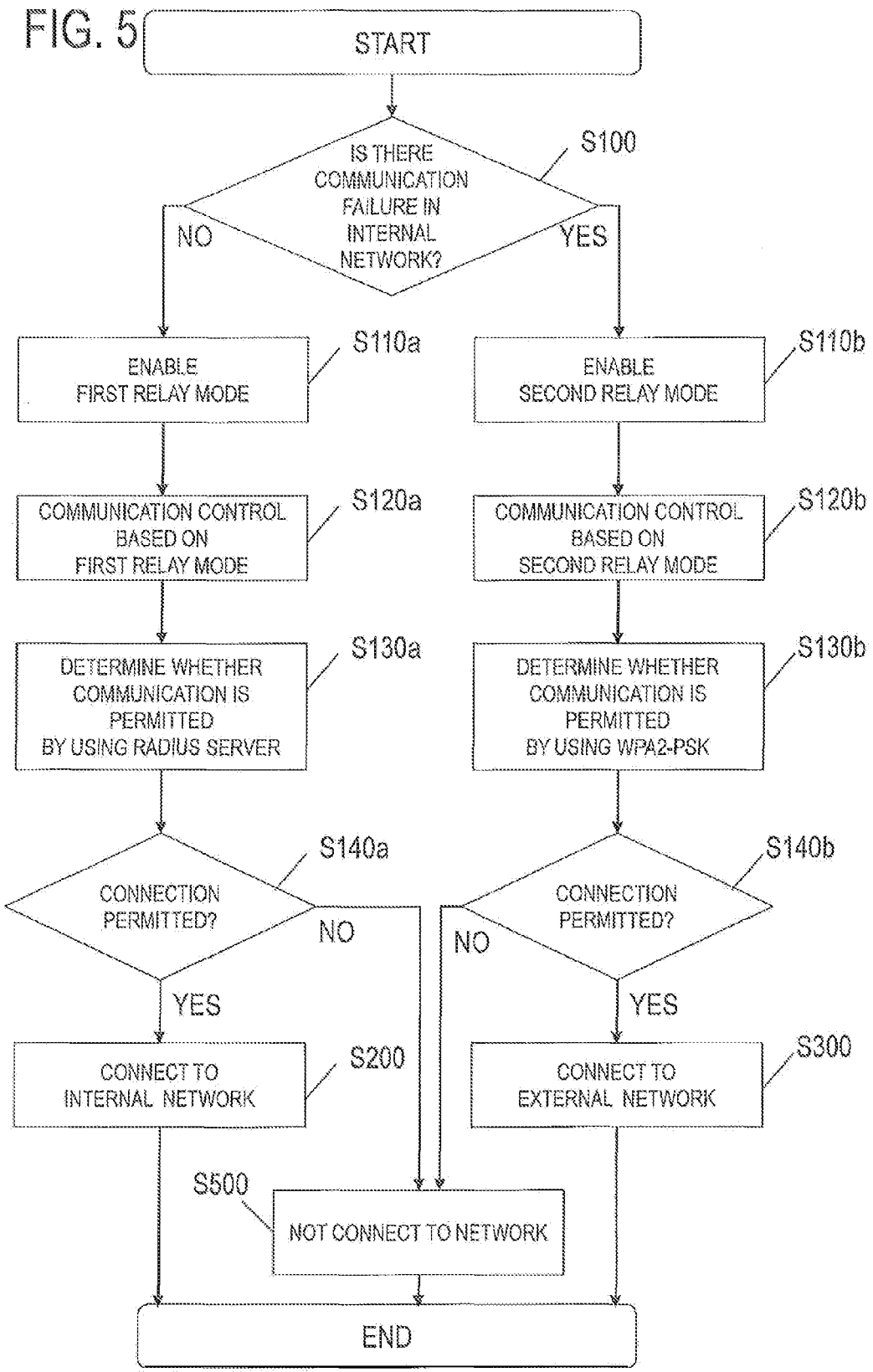
FIG. 5 is a flowchart showing a flow of operation of the relay device according to the first embodiment.

FIG. 5 is a flowchart showing a flow of operation of the relay device 100 in this embodiment. To begin with, the communication failure determination section 240 checks connection with the authentication server 802, and thereby determines whether there is a communication failure in the internal network 800 (step S100). If it is determined that there is no communication failure in the internal network 800 (NO in step S100), the relay mode controlling section 220 enables the first relay mode (SSID1) (step S110a). The communication control section 230 performs communication control based on the first relay mode (SSID1) (step S120a).

The wireless network control section 231 uses the wireless interface 500 to set the SSID of the wireless network 700 as "SSID1", and performs wireless communication with a station having the same SSID. The permissible connection determination section 232 performs permissible connection determination with respect to a station (e.g., station 702) which requests connection (communication relay) (step S130a). In accordance with the setting of the first relay mode, the permissible connection determination section 232 inquires the authentication server 802 about the determination result. If the authentication server 802 indicates that the connection (communication relay) is permissible (YES in step S140a), the communication control section 230 relays communication to/from the station. Here, in the first relay mode, the "SSID1" is associated with the first virtual LAN, "VLAN1". Thus, the communication control section 230 relays communication to/from the station using the first port P1 associated with the "VLAN1". Accordingly, the station (e.g., station 702) can access the internal network 800 (step S200). If the authentication server 802 indicates that the connection (communication relay) is not permissible (NO in step S140a), the station (e.g., station 702) cannot access the internal network 800 (step S500).

On the other hand, when it is determined that a communication failure has occurred in the communication line connecting the relay device 100 (first port P1) and internal network 800 (YES in step S100), the relay mode controlling section 220 disenables the first relay mode (SSID1), and enables the second relay mode (SSID2) (step S110b). The communication control section 230 discontinues the communication control based on the first relay mode, and performs communication control based on the second relay mode (step S120b).

The wireless network control section 231 uses the wireless interface 500 to set the SSID of the wireless network 700 as "SSID2", and performs wireless communication with a station having the same SSID. The permissible connection determination section 232 performs permissible connection determination with respect to a station (e.g., station 702) which requests connection (communication relay) (step S130b). In accordance with the setting of the second relay mode (WPA2-PSK in FIG. 3), the permissible connection determination section 232 performs the permissible connection determination using the "pre-shared key" stored in the relay mode storing section 310. If the connection (communication relay) is permitted (YES in step S140b), the communication control section 230 relays communication to/from the station. Here, in the second relay mode, the "SSID2" is associated with the "VLAN2". Thus, the communication control section 230 relays communication to/from the station using the second port P2 associated with the "VLAN2". Accordingly, although the station (e.g., station 702) cannot access the internal network 800, the station can access the outside network 900 (step S300). If the connection is, not permitted, (NO in step S140b), the station (e.g., station 702) also cannot access the outside network 900 (step S500).

As described above, in this embodiment, if it is determined that, there is no communication failure in a specific communication path (communication path leading to the internal network 800) passing through the communication interface 510, the first relay mode which controls relay using the specific communication path is enabled, and thus the relay device 100 can control communication using the specific communication path for relay the communication. Further, in the first relay mode of this embodiment, the target host whose link integrity is to be checked is set to the authentication server 802, and the relay device 100 can perform authentication using the authentication server 802. Further, since the relay device 100 adopts a security method using the authentication server (WPA2-EAP), it is possible to reduce a possibility, that an unintended station is connected to the internal network 800 as compared to a case where a method without using the authentication server is adopted.

In the case of communication failure occurring in the specific communication path, the first relay mode is disenabled, and the second relay mode is enabled. The relay device 100 performs communication control based on the second relay mode without discontinuing the function of the wireless communication. Accordingly, even in the case of communication failure occurring in the specific communication path, the communication relay using the relay device 100 is enabled, and thus the relay device 100 can reduce a possibility of decrease in convenience. Particularly, in the second relay mode of this embodiment, communication to/from the station which is permitted by a preliminarily set security method (WPA2-PSK) is relayed by the relay device 100. Thus, it is possible to reduce a possibility that an unintended station uses the relay device 100. In addition, the relay device 100 also relays communication via the outside network 900 which does not include the specific communication path. Thus, even in the case of communication failure occurring in the specific communication path, communication relay can be performed appropriately.

Further, in this embodiment, the first relay mode and the second relay mode are allocated with different SSIDs. Thus, the relay device 100 can use one of two types of wireless networks depending on the status of the specific communication path. Particularly, the relay mode storing section 310 stores communication parameters (e.g., security method, LAN-ID, and the like) of the wireless networks for the respective SSIDs. Thus, the relay device 100 can use the wireless network suitable to the status of the specific communication path.

Further, in this embodiment, the relay mode storing section 310 stores the first relay mode and the second relay mode, where different security methods are set to the first relay mode and the second relay mode, respectively. Thus, the relay device 100 can use the security method suitable to the status of the specific communication path. Particularly, in this embodiment, the authentication server 802 is set as the target host whose link integrity is to be checked, and the security method of the first relay mode is a security method using the authentication server 802. Thus, if access to the authentication server 802 is possible, the relay device 100 can improve security as compared to the case where permissible connection determination is made without using the authentication server 802. On the other hand, the security method of the second relay mode is such a method that performs the permissible connection determination without using the authentication server 802. Thus, even if access to the authentication server 802 is not possible, the relay device 100 can maintain a certain level of security. The target whose link integrity is to be checked may include at least a part of the communication path leading to the authentication server 802. Alternatively, a relay device (e.g., switch) provided to the internal network 800 may be the target. In this case as well, it is possible to check whether there is a communication failure in a path connecting the relay device 100 and the internal network 800, and thus, the relay device 100 can determine, to a certain level of reliability, whether the authentication server 802 is accessible.

Further, in the relay mode storing section 310 of this embodiment, the first relay mode and the second relay mode are associated with different VLAN-IDs, respectively. Thus, the relay device 100 of this embodiment can use as a communication relay destination a network suitable to the status of the specific communication path. Alternatively, a relay mode may be allocated with a plurality of VLANs. In this case, for example, at least one of the VLANs allocated to the first relay mode may include the specific communication path. In addition, preferably, none of the VLANs allocated to the second relay mode include the specific communication path.

Modified First Embodiment

Figure 6:
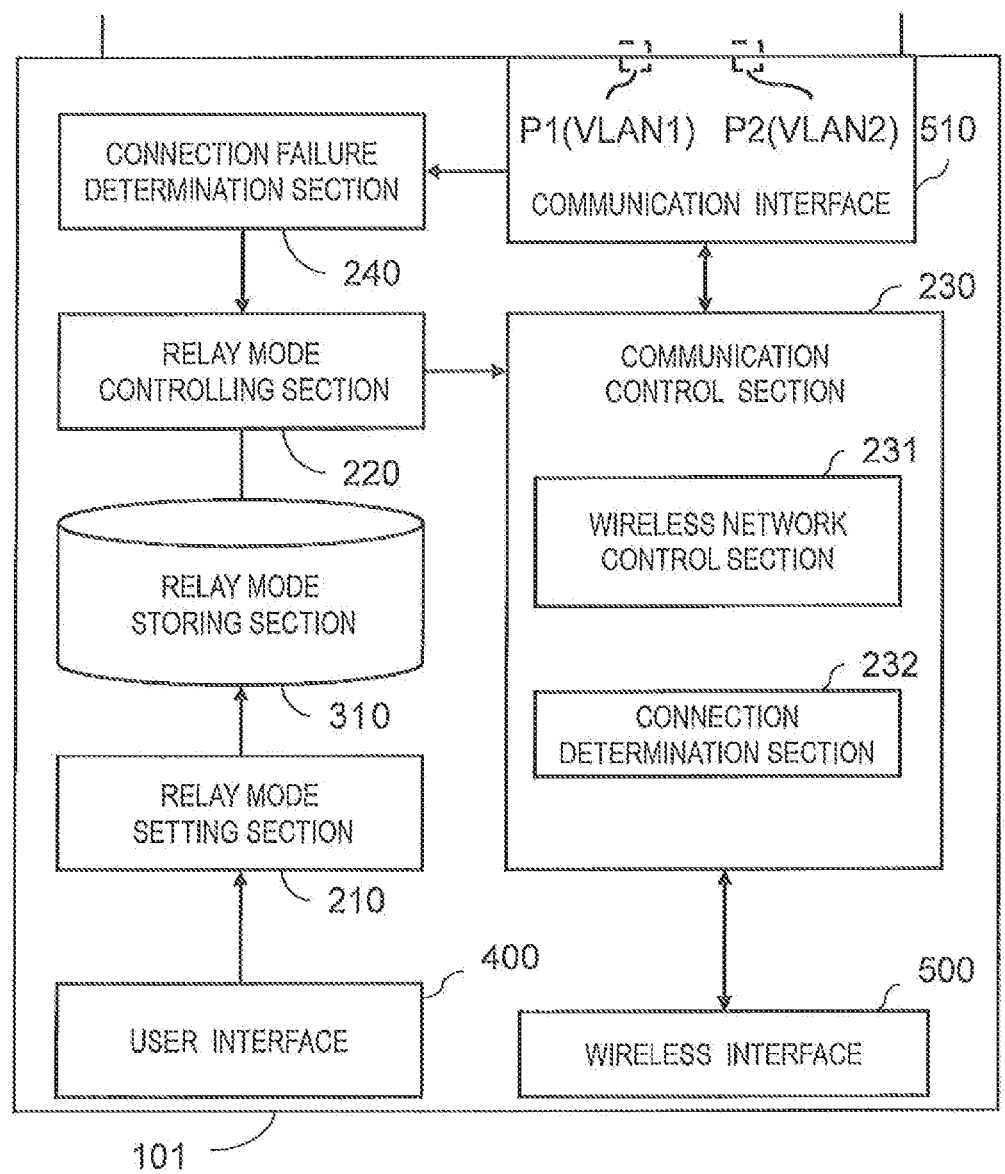
FIG. 6 is a block diagram illustrating a configuration of a relay device according to a modification of the first embodiment of the present invention.

Next, a modification of the first embodiment will be described. FIG. 6 is a block diagram illustrating the configuration of a relay device 101 according to this modification. The relay device 101 includes, in addition to the configuration of the relay device 100, a relay mode setting section 210 and a user interface 400. Since operation of the configuration other than the relay mode setting section 210 and the user interface 400 is the same as that in the first embodiment, no description will be given thereof.

The user interface 400 allows the user to directly perform settings of the relay device 100, and includes an operation section (e.g., switches or buttons) and a display section (e.g., lamps and liquid crystal display).

The relay mode setting section 210 sets the first relay mode and the second relay mode which are stored in the relay mode storing section 310. In this embodiment, the relay mode setting section 210 performs settings in accordance with an instruction by the user. The relay mode setting section 210 performs, for example, settings in accordance with an instruction inputted by the user to the user interface 400. Alternatively, the relay mode setting section 210 may perform settings in accordance with an instruction by the user inputted through a terminal connected to a management port (not illustrated) provided in the relay device 101. The relay mode setting section 210 may display, on a terminal connected to the wireless interface 500 or the communication interface 510, a web page for setting the first relay mode and the second relay mode, and perform settings in accordance with an instruction inputted by the user through the web page.

The communication path which is included in the network and used in the first relay mode is set at the specific communication path, and the relay mode setting section 210 performs settings to identify the specific communication path connected to the communication interface 510.

The relay mode setting section 210 also performs other settings relating to the operation of the relay device 101. For example, the relay mode setting section 210 sets the first port P1 to be included in the first virtual LAN (VLAN1), and sets the second port P2 to be included in the second virtual LAN (VLAN2).

Second Embodiment

Figure 7:
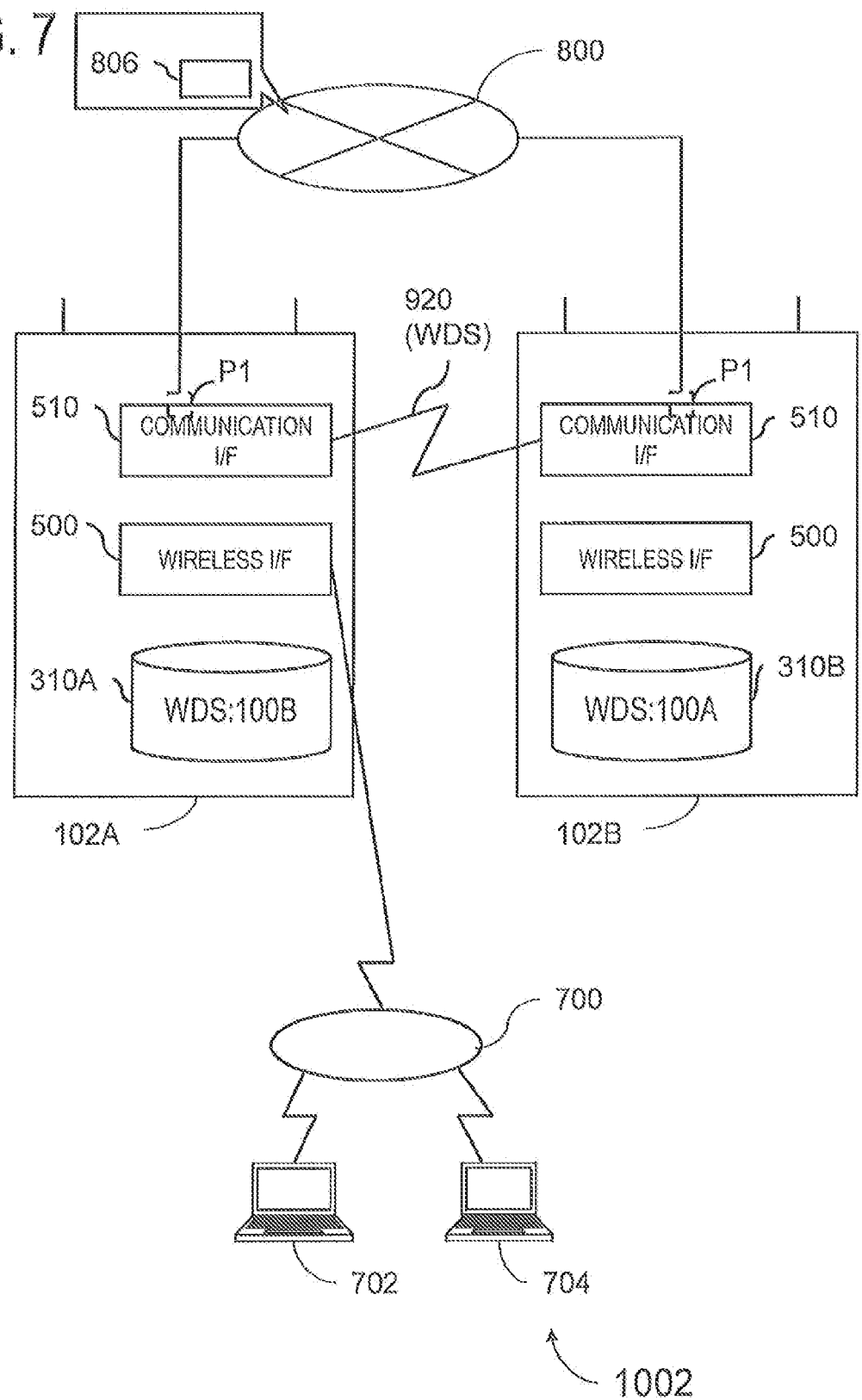
FIG. 7 is an explanatory diagram illustrating a network system according to a second embodiment of the present invention.

FIG. 7 is an explanatory diagram illustrating a network system 1002 according to a second embodiment. The network system 1002 includes the internal network 800, two relay devices 102A and 102B which are connected to the internal network 800 by means of wired communication, and stations 702 and 704 which are connected to the relay device 102A by means of wireless communication. For the purpose of brevity, FIG. 7 illustrates only a part of the configuration of the relay devices 102A and 102B.

In this embodiment, the first relay device 102A is communicable with the second relay device 102B by means of wireless communication. Particularly, in this embodiment, wireless communication between the relay devices 102A and 102B is performed using data frames compliant with a so-called Wireless Distribution System (hereinafter also referred to as "WDS"). Hereinafter, communication using the WDS data frames is also referred to as "WDS communication". In addition, a network based on the WDS communication between the relay devices 102A and 102B is also referred to as a "WDS network 920". Relay mode storage sections 310A and 310B included in the relay devices 102A and 102B, respectively, have settings for the WDS communication (connection).

In relay using the WDS communication, a layer 2 address (e.g., MAC address) will not be converted, and information above the layer 2 (e.g., IP address and the like) will hot be referred to. That is, if the first relay device 102A relays communication to the second relay device 102B using the WDS communication, the first relay device 102A acts as a so-called repeater. Accordingly, the first relay device 102A can relay communication without restricting communication protocols of the upper layers (e.g., layer 3 protocol).

Figure 8:
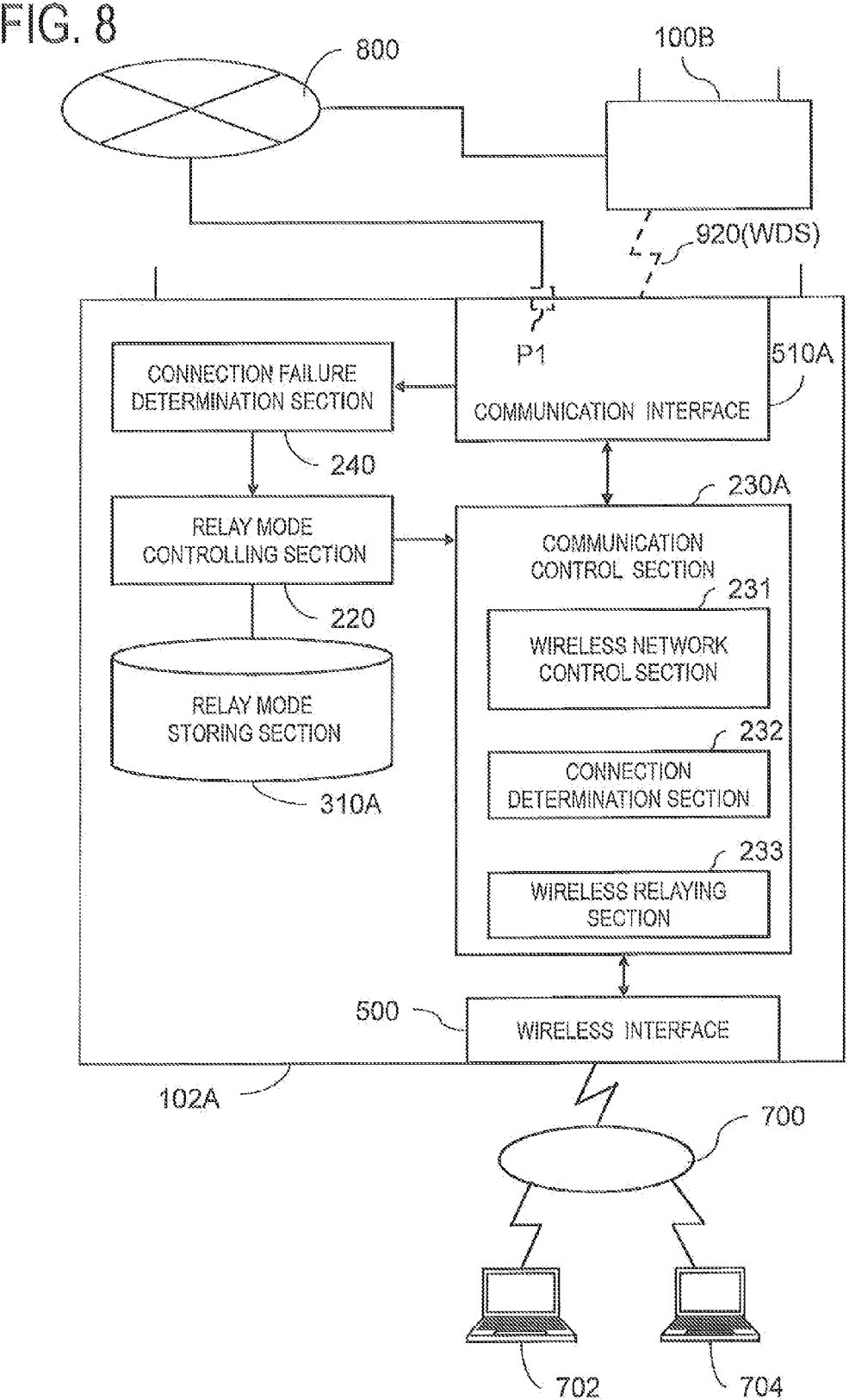
FIG. 8 is a block diagram illustrating a configuration of a relay device according to the second embodiment.

FIG. 8 illustrates an internal configuration of the first relay device 102A. The internal configuration of the second relay device 102B is the same as that of the first relay device 102A. The relay device 102A is different from the relay device 100 of the first embodiment in that: a communication interface 510A of the relay device 102A has a wireless communication function; part of the data stored in the relay mode storing section 310A is different from that of 300; and a communication control section 230A includes a wireless relaying section 233. Those components which operate in the same manner as those of the relay device 100 in the first embodiment are denoted by the same reference numerals as those in FIG. 2, and no description thereof will be given.

In the communication interface 510A, communication with the second relay device 102B is performed by means of wireless communication using the WDS communication, instead of wired communication as in the first embodiment. The wireless communication function of the communication interface 510A may be integrated with the wireless interface 500.

The wireless relaying section 233 uses the wireless communication function of the communication interface 510A, and realizes the WDS communication with another relay device (e.g., relay device 102B).

Figure 9:
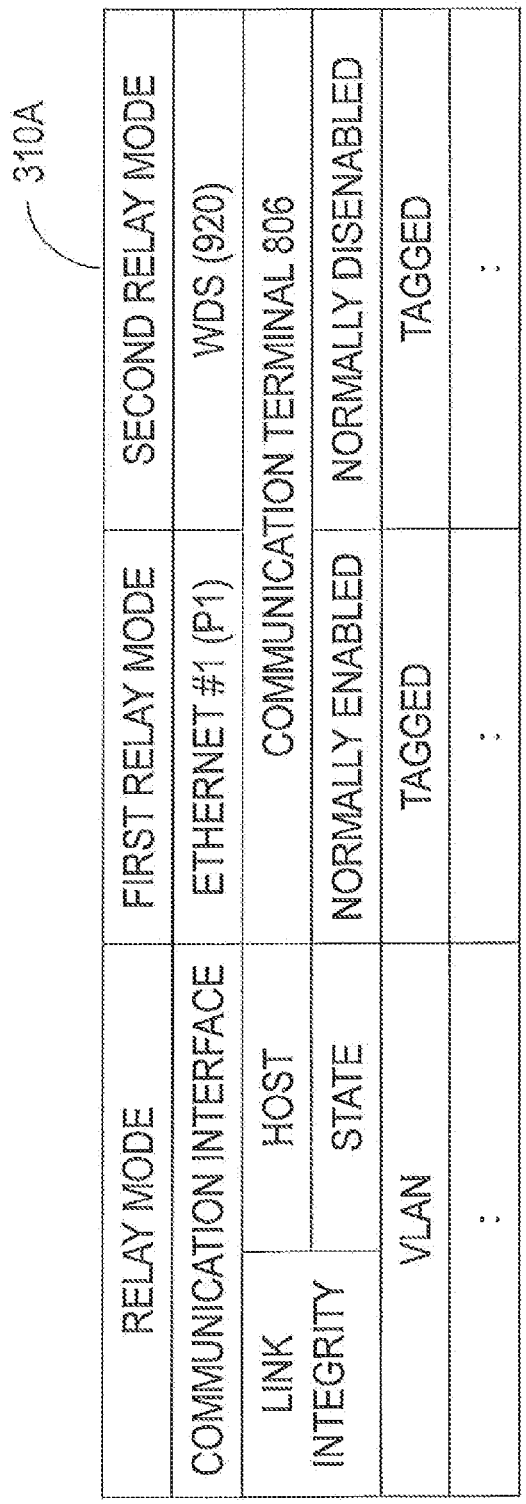
FIG. 9 is an explanatory diagram illustrating an example of information stored in a relay mode storing section 310A according to the second embodiment.

FIG. 9 is an explanatory diagram illustrating an example of information stored in the relay mode storing section 310A in the second embodiment. In this embodiment, a plurality of items including a communication interface, link integrity (host and state), and VLAN are set with respect to each of the first relay mode and the second relay mode.

The "communication interface" indicates a communication interface used for communication relay. In this embodiment, the interface of the first relay mode is set as the "Ethernet (registered trademark) 1 (first port P1)", and the interface of the second relay models set as the "WDS (WDS network 920)". As illustrated in FIG. 7, since the internal network 800 is connected to the first port P1, the first relay device 102A relays, in the first relay mode, communication between the wireless network 700 and the internal network 800. Meanwhile, since the WDS network 920 is connected to the second relay device 102B, the first relay device 102A acts, in the second relay mode, as a repeater for relaying communication to the second relay device 102B.

Setting of the link integrity checking is the same as that illustrated in FIG. 3. In this embodiment, the target host is a communication device 806. As illustrated in FIG. 7, the communication device 806 is included in the internal network 800. The communication device 806 may be a communication device (e.g., switch) capable of echo reply may be. By setting the communication device 806 as the target host, the status of the communication path leading to the internal network 800 can be checked. In addition, the state of the first relay mode is set as "normally enabled" and the state of the second relay mode is set as "normally disenabled".

The "VLAN" indicates the setting of a so-called "tag VLAN" for each of the first relay mode and the second relay mode. With the use of the "tag VLAN", the first relay device 102A utilizes a plurality of VLANs via the interfaces used for relay.

Figure 10:
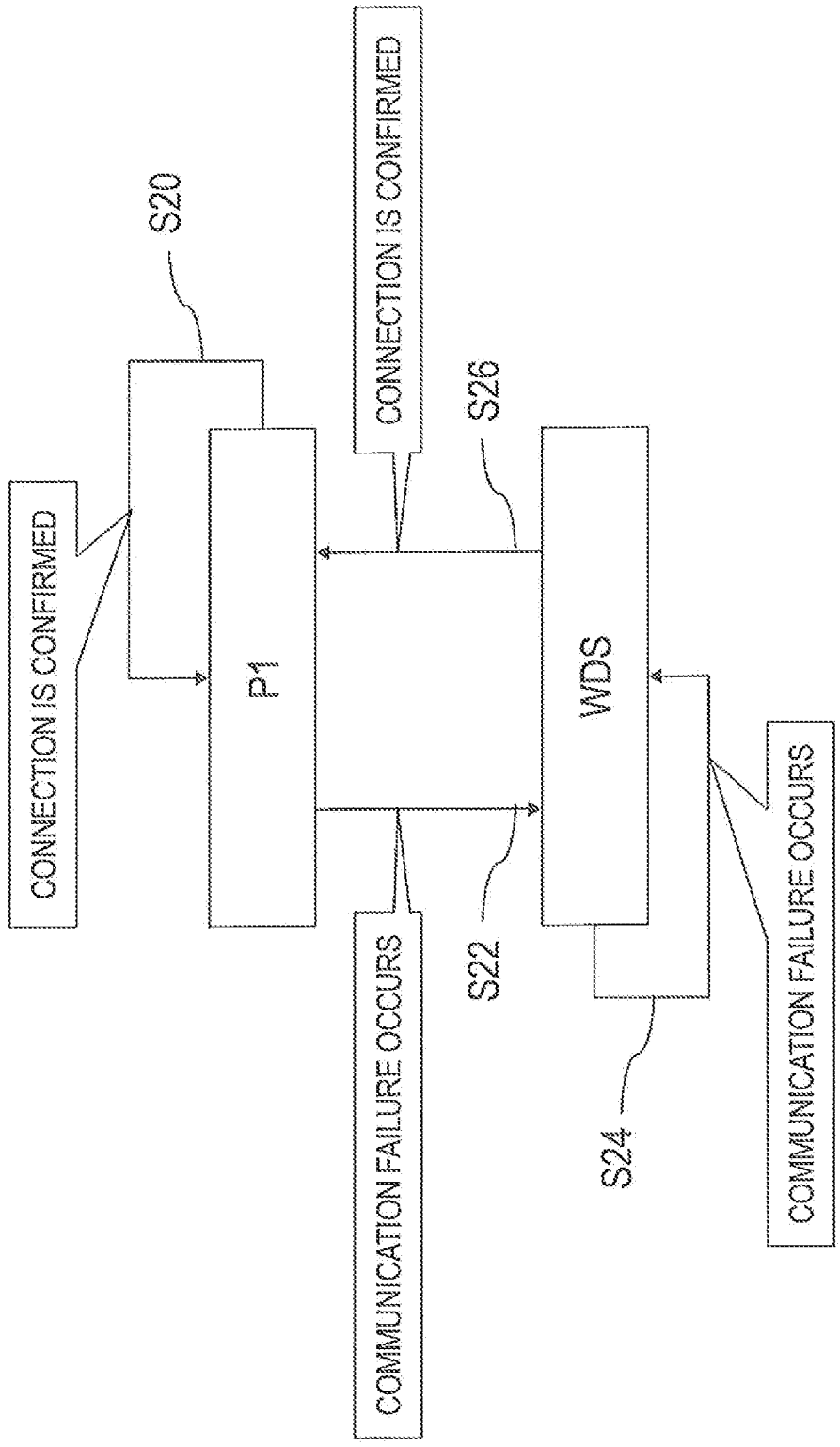
FIG. 10 is a state transition diagram illustrating transition between a first relay mode and a second relay mode according to the second embodiment.

FIG. 10 is a state transition diagram indicating transition between the first relay mode and the second relay mode in this embodiment. The transition between the relay modes is performed in the same manner as the transition in FIG. 4. As compared to the first embodiment, as illustrated in FIG. 9, the target host whose link integrity is to be checked in this embodiment is different from that of the first embodiment, and contents of the first relay mode and the second relay mode are also different. As illustrated, while connection to the target host (communication device 806) is confirmed, the first relay mode (first port P1) is enabled (step S20). In the case of communication failure, the first relay mode (first port P1) is disenabled, and the second relay mode (WDS network 920) is enabled (step S22). While the communication failure is not solved, the second relay mode (WDS network 920) is enabled (step S24). When the communication failure is solved, the second relay mode (WDS network 920) is disenabled, and the first relay mode (first port P1) is enabled (step S26).

Figure 11:
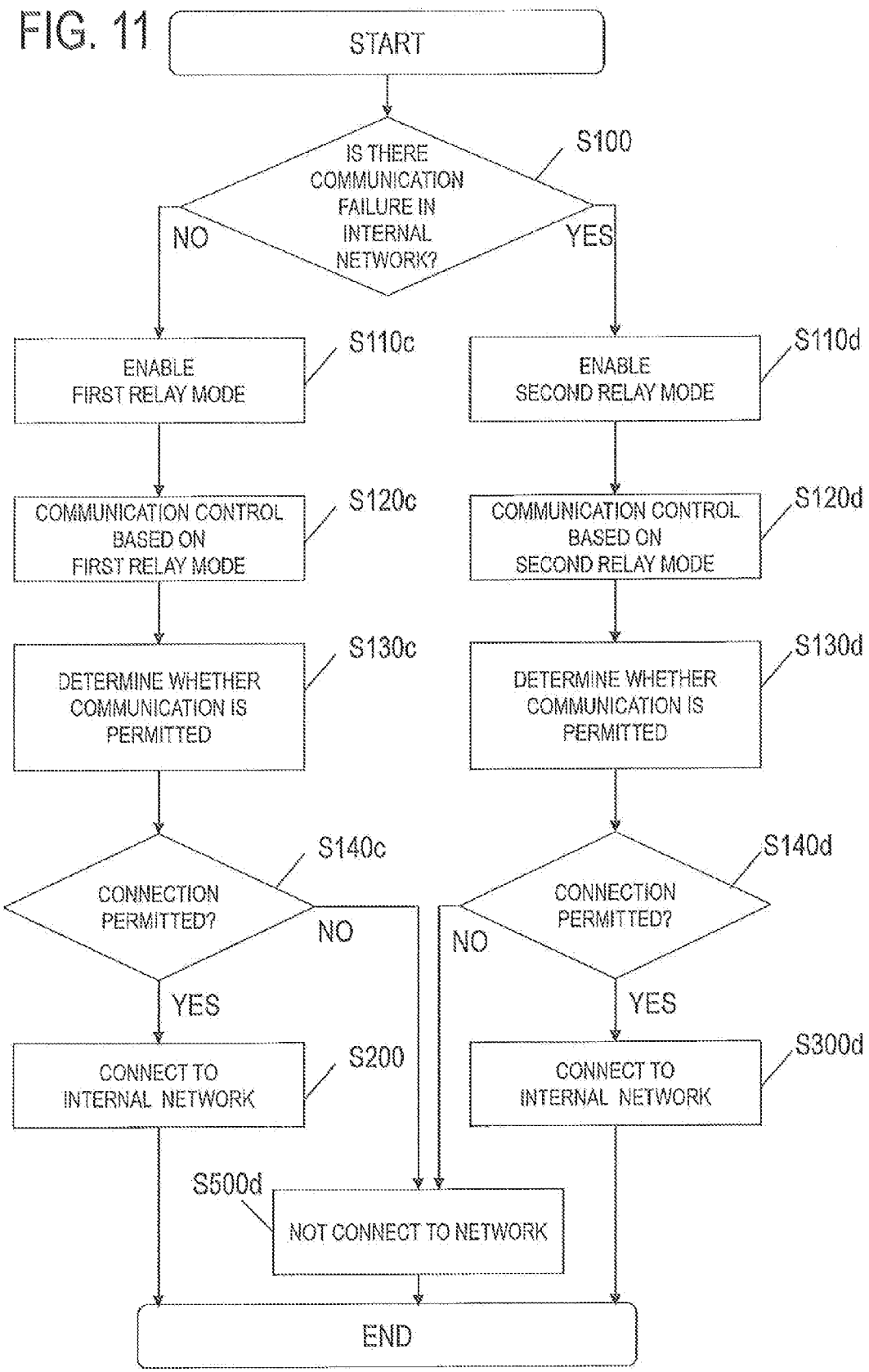
FIG. 11 is a flowchart showing a flow of operation of the relay device according to the second embodiment.

FIG. 11 is a flowchart showing a flow of operation of the relay device 102A in this embodiment. Here, the contents of the operation that are the same as those in first embodiment are denoted by the same reference numerals, respectively. The communication failure determination section 240 checks connection with the communication device 806, and thereby determines whether communication failure has occurred in the internal network 800 (step S100). If it is determined that there is no communication failure (NO in step S100), the relay mode controlling section 220 enables the first relay mode (first port P1) (step S110*c*). The communication control section 230A controls communication based on the first relay mode (step S120*c*). Accordingly, the function of the wireless relaying section 233 is disenabled.

The permissible connection determination section 232 performs permissible connection determination in accordance with predetermined settings (not illustrated) (step S130*c*). If the connection is permitted (YES in step S140*c*), the wireless network control section 231 establishes connection with the wireless network 700. The communication control section 230A relays communication to/from a station (e.g., station 702) connected to the wireless interface 500 using the first port P1. Accordingly, the station (e.g., station 702) can access the internal network 800 (step S200). If the connection is not permitted (NO in step S140*c*), the station (e.g., station 702) cannot access the internal network 800 (step S500*d*).

If it is determined that a communication failure has occurred in the communication line connecting the first relay device 102A (first port P1) and the internal network 800 (YES in step S100), the relay mode controlling section 220 disenables the first relay mode (first port P1) and enables the second relay mode (WDS) (step S110*d*). The communication control section 230A discontinues control based on the first relay mode, and starts controlling communication based on the second relay mode (step S120*d*). Accordingly, the function of the wireless relaying section 233 is enabled. The wireless relaying section 233 establishes the WDS network 920 with the second relay device 102B.

The permissible connection determination section 232 performs permissible connection determination in accordance with predetermined settings (not illustrated) (step S130*d*). If the connection is permitted (YES in step S140*d*), the wireless network control section 231 starts performs communication to/from controlling the wireless network 700. The control may be the same between the first relay mode and the second relay mode, or may be different therebetween. The wireless relaying section 233 relays communication to/from a station (e.g., station 702) connected to the wireless interface 500 using the WDS network 920. Accordingly, the station (e.g., station 702) can access the internal network 800 via the first relay device 102A and the second relay device 102B (step S300*d*). If the connection is not permitted (NO in step S140*d*), the station (e.g., station 702) cannot access the internal network 800 (step S500*d*).

As described above, in this embodiment, if it is determined that there is no communication failure in the specific communication path (communication path to the internal network 800) passing through the communication interface 510, the first relay device 102A enables the first relay mode which controls communication relay using the specific communication path. Accordingly, the first relay device 102A can perform relay (communication relay to the internal network 800) using the specific communication path appropriately.

If a communication failure has occurred in the specific communication path, the first relay device 102A disenables the first relay mode, and enables the second relay mode to perform communication based, on the second relay mode. In the second relay mode of this embodiment, the first relay device 102A acts as a repeater using the WDS communication with the second relay device 102B. Accordingly, a station (e.g., station 702) connected to the first relay device 102A can access the internal network 800 via the first relay device 102A and the second relay device 102B.

Communication relay based on the first relay mode may be performed using a part of the specific communication path whose link integrity is to be checked, instead of using the whole of the specific communication path. In this case as well, if it is determined that a communication failure has occurred, there is a possibility that failure has occurred in the communication path used for communication based on the first relay mode. Thus, by switching the relay mode, communication relay can be performed appropriately depending on whether there is a communication failure. The relay based on the second relay mode is preferably performed without using the specific communication path.

For the wireless communication between the first relay device 102A and the second relay device 102B, communication different from the WDS communication may be used. For example, communication using data frames compliant with a so-called infrastructure mode or communication using data frames compliant with a so-called ad hoc mode may be used. Further, the second relay device 102B may be an access point without a function of relay mode switching performed depending on the occurrence of communication failure. In this manner, a generalized relay device which does not have such a special function can be used as the second relay device 102B. In this embodiment, the first relay device 102A itself is capable of preventing communication path loops, and thus the second relay device 102B need not include a so-called spanning tree (IEEE 802.1D) function.

Third Embodiment

Figure 12:
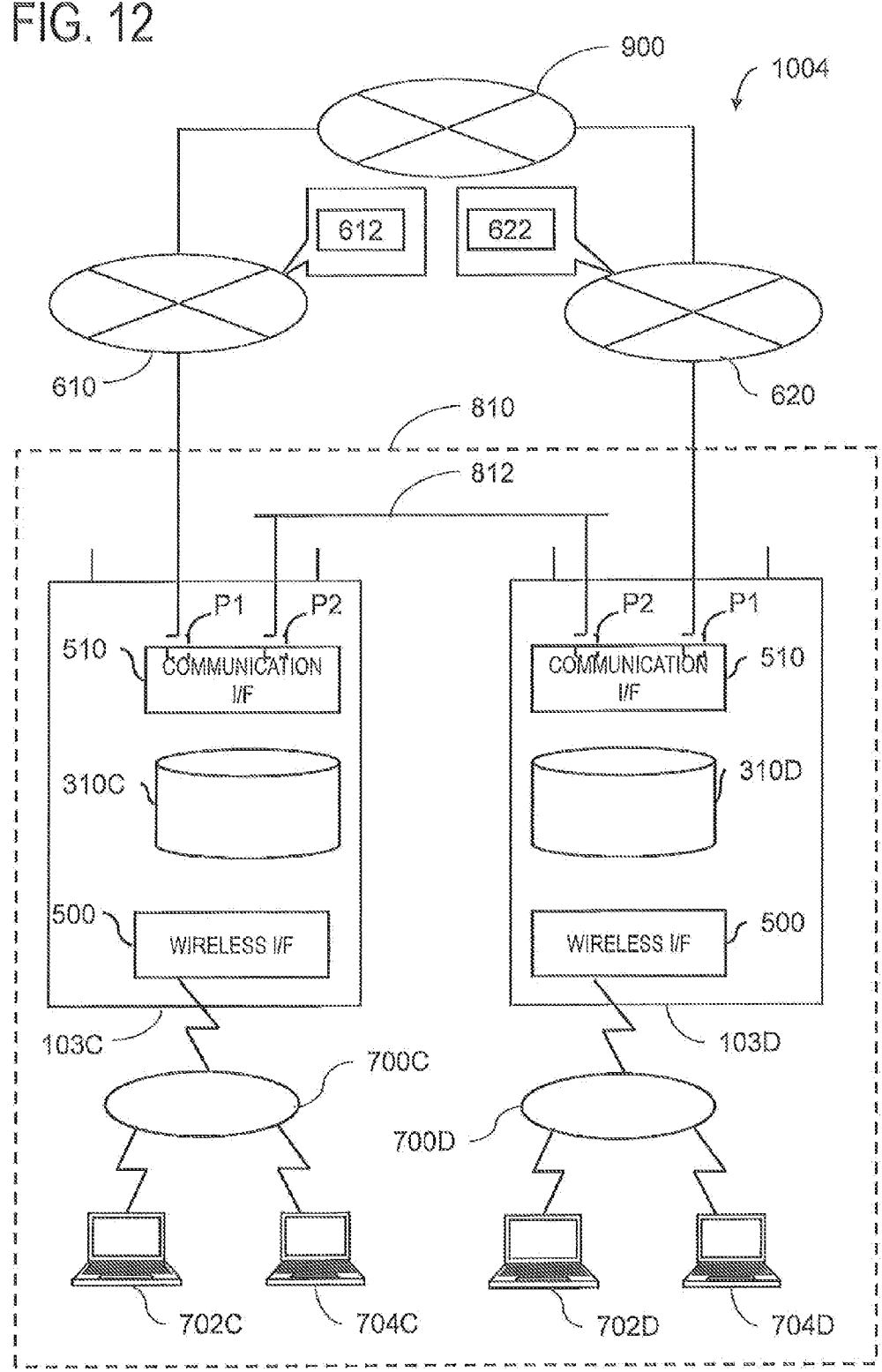
FIG. 12 is an explanatory diagram illustrating a network system according to a third embodiment.

FIG. 12 is an explanatory diagram illustrating a network system 1004 according to a third embodiment. The network system 1004 includes the outside network 900, two provider networks 610 and 620 which provide service for connection to the outside network 900, a first relay device 103C and a second relay device 103D connected to the provider networks 610 and 620, respectively, stations 702G and 704C wirelessly connected to the first relay device 103C, stations 702D and 704D wirelessly connected to the second relay device 103D, and an infernal line 812 connecting the first relay device 103C and the second relay device 103D. With the first and second relay devices 103C and 103D, the stations 702C and 704C wirelessly connected to the first relay device 103C, the stations 702D and 704D wirelessly connected to the second relay device 103D, and the internal line 812, an internal network 810 is configured. In FIG. 12, the configurations of the relay devices 103C and 103D are only partially illustrated for the sake of brevity.

The provider networks 610 and 620 include gateways 612 and 622, respectively, for providing connection to the outside network 900. The gateways 612 and 622 relay communication between one network and another network which uses a communication protocol different from that of the one network. In this embodiment, the gateways 612 and 622 respectively relay communications between a network (e.g., internal network 810) connected to the provider networks 610 and 620 and the outside network 900.

In this embodiment, the first relay device 103C operates as a so-called router for connecting the internal network 810 to the first provider network 610, whereas the second relay device 103D operates as a so-called router for connecting the internal network 810 to the second provider network 620. The router relays communication frames, based on header information (e.g., IP address) of the layer 3 (network layer) in received communication frames. The first port P1 of the first relay device 103C establishes a connection with the first provider network 610, and the second port P2 of the first relay device 103C establishes a connection with the internal line 812. Oh the other hand, the first port P1 of the second relay device 103D establishes a connection with the second provider network 620, and the second port P2 of the second relay device 103D establishes a connection with the internal line 812.

There are two access paths from the internal network 810 to the outside network 900: a path passing through the first relay device 103C and the first provider network 610, and a path passing through the second relay device 103D and the second provider network 620. As will be described later, the network system 1004 in this embodiment uses either one of the paths depending on whether there is a communication failure. The relay device of the other path operates as a so-called bridge (also referred to as a switch) instead of operating as a router. The bridge relays communication frames, based on header information (e.g., MAC address) of the layer 2 (data link layer) in received communication frames.

Figure 13:
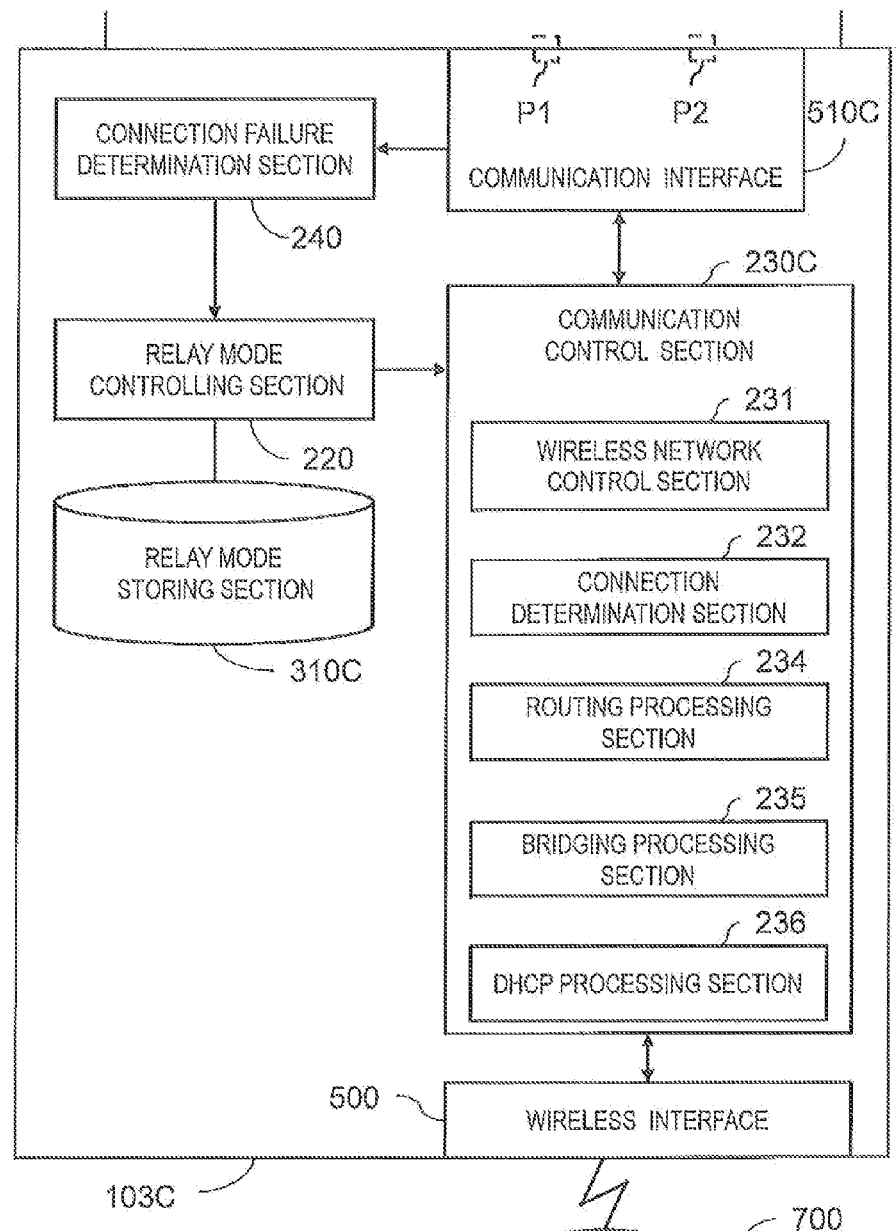
FIG. 13 is a block diagram illustrating a configuration of a relay device according to the third embodiment.

FIG. 13 illustrates an internal configuration of the first relay device 103C. The internal configuration of the second relay device 103D is the same as that of the first relay device 103C. The relay device 103C is different from the relay device 100 in the first embodiment in that: the second port P2 of a communication interface 510C of the relay device 103C has a layer 2 communication function; part of the data stored in the relay mode storing section 310C is different from that of 300; and a communication control section 230C includes a routing processing section 234, a bridging processing section 235, and a DHCP processing section 236. Here, those components which operate in the same-manner as the relay device 100 in the first; embodiment are denoted by the same reference numerals in FIG. 2, and no description thereof will be given.

The second port P2 of the communication interface 510C, which performs communication with the second relay device 103D, has a layer 2 communication function.

The routing processing section 234 realizes a router function. The bridging processing section 235 realizes a bridge function. The DHCP processing section 236 realizes a process based on a DHCP. The second relay device 103D also has a communication control, section 230D having the same configuration as the communication control section 230C. The communication control sections 230C and 230D realize a UPnP function. In addition, the routing processing section 234 of each of the communication control sections 230C and 230D realizes a RIP function. The UPnP function and the RIP function will be described later in detail.

Figure 14:
FIG. 14 is an explanatory diagram illustrating an example of information stored in a relay mode storing section 310C of a first relay device.

FIG. 14 is an explanatory diagram illustrating an example of information stored in the relay mode storing section 31C of the first relay device 103C. In this embodiment, a plurality of items including a subnet, link integrity (host and state) checking, a DHCP, a UPnP, and a RIP are set with respect to each of the first relay mode and the second relay mode.

The subnet setting represents a subnet setting for operation as a router. This setting is not available in the relay mode that operates as a bridge. In this embodiment, the subnet of the first relay mode is set as a "subnet of the router to the first provider network 610". No subnet is set for the second relay mode. In addition, in this embodiment, the following contents (not illustrated) are stored as settings common to the first relay mode and the second relay mode. That is: (1) the first port P1 in FIG. 12 is an outside network port, and the first provider network 610 is connected to the first port P1; (2) the second port P2 is an internal network port; and (3) a wireless network. 700C with which the first relay device 103C establishes connection is included in the internal network.

The setting of the "subnet of the router to the first provider network 610" includes various specific settings to the first relay device 103C to operate as a router to the first provider network 610 (not illustrated). For example, the gateway 612 is preliminarily set as the default gateway. Further, an IP address allocated to the first port P1 and a name server (also referred to as a DNS server) are preliminarily set. These settings may be done by the user interface 400 or the relay mode setting section 210 described with respect to the modification of the first embodiment. Alternatively, when the first relay device 103C is connected to the first provider network 610, the first provider network 610 may provide the first relay device 103C with information specific to the settings.

In the case of no subnet setting as in the second relay mode, the first relay device 103C operates as the so-called bridge.

The link integrity checking setting is the same as that in FIG. 3. In this embodiment, the gateway 612 is the target host. Accordingly, the status of the communication path between the first relay device 103G and the first provider network 610 can be checked. Further, the state of the first mode, is set as "normally enabled", and the state of the second mode, is set as "normally disenabled".

The "DHCP" represents the setting of whether address allocation based on the Dynamic Host Configuration Protocol (DHCP) is enabled. In this embodiment, the DHCP is set "enabled" in the first relay mode, and the DHCP is set "disenabled" in the second relay mode. When the address allocation is enabled, the first relay device 103C allocates to a station connected to the first relay device 103C via the wireless network 700C or the internal line 812 a network address (e.g., so-called IP address) for identification of the station. In addition to the network address, the first relay device 103C provides the station with other information (e.g., so-called subnet mask, default gateway, and name server). Such a function is hereinafter also referred to as a "DHCP function".

The "UPnP" represents the setting of whether a function based on the Universal Plug and Play (UPnP) protocol (hereinafter referred to as "UPnP function") is enabled. In this embodiment, the UPnP function is "enabled" in the first relay mode; and the UPnP function is "disenabled" in the second relay mode. The first relay device 103C in this embodiment has the following UPnP function. That is: (1) station (device) detection using the UPnP; (2) response to a port mapping request from a station in the internal network; and (3) notification of the IP address for the outside network (IP address of the first port P1) to the station in the internal network. When these functions are enabled, communication application corresponding to the UPnP can be used (e.g., messenger application for transmitting/receiving messages via the outside network 900 becomes operable).

The "RIP" represents the setting of whether exchange of route information based on the Routing Information Protocol (RIP) is enabled. In this embodiment, the RIP is set as "enabled" in the first relay mode, and set as "disenabled" in the second relay mode. The route information represents correspondence between a communication frame destination and a port leading to the destination (communication frame relay is performed based oil the route information). Here, the port may be a physical port like the first port P1 or may be a logical port (e.g., VLAN) formed using one or more physical ports.

As described above, the DHCP, the UPnP, and the RIP are enabled in the first relay mode where the first relay device 103C operates as the router, and are disenabled in the second relay mode where the first relay device 103C does not operate as the router. The reason is as follows. When the first relay device 103C operates as the router, various services (services provided by the first provider network 610 or the outside network 900) are provided via the first relay device 103C. Thus, the first relay, device 103C preferably manages; various pieces of information used for communication.

Figure 15:
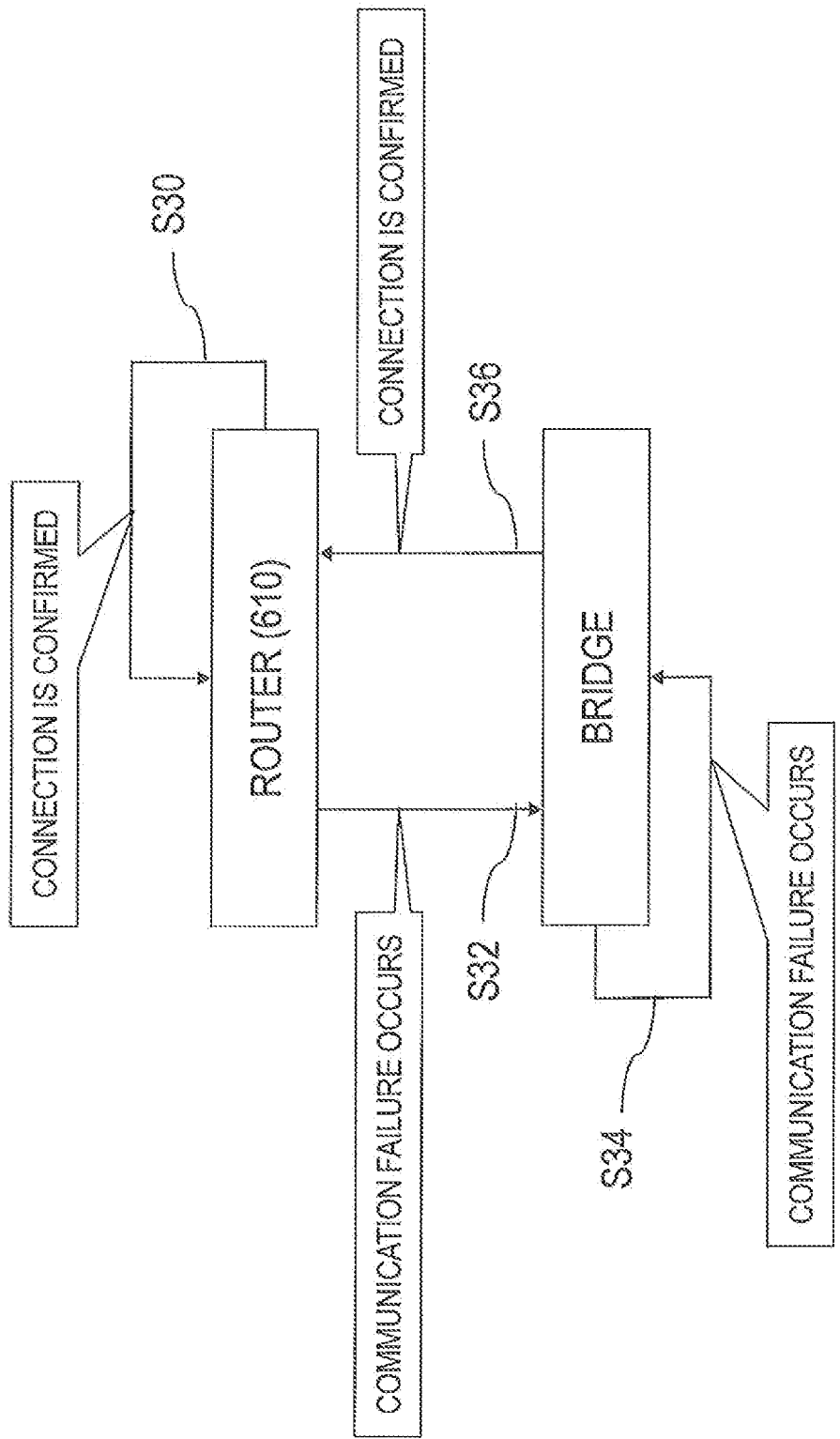
FIG. 15 is a state transition diagram illustrating transition between a first relay mode and a second relay mode of a first relay device 103C.

FIG. 15 is a state transition diagram indicating transition between the first relay mode and the second relay mode of a first relay device 103C. The transition between the relay modes is performed in the same manner as the transition in FIG. 4. As compared to the first embodiment, the target host whose link integrity is to be checked in this embodiment is different from that of the first embodiment, and contents of the first relay mode and the second relay mode are also different. As illustrated, while connection to the target host (gateway 612) is confirmed, the first relay mode (router function) is enabled (step S30). In the case of communication failure, the first relay mode (router function) is disenabled, and the second relay mode (bridge function) is enabled (step S32). While the communication failure is not solved, the second relay mode (bridge function) is enabled (step S34). When the communication failure is solved, the second relay mode (bridge function) is disenabled, and the first relay mode (router function) is enabled (step S36).

FIG. 16 is an explanatory diagram illustrating an example of a relay mode storing section 310D of the second relay device 103D. Contents of the respective items in the relay mode storing section 310D except for the link integrity are converse, between the first relay mode and the second relay mode as compared to those of the relay mode storing section 310C of the first relay device 103C. In addition, for the subnet setting of the second relay mode, the second provider network 620 is used, instead of the first provider network 610. Accordingly, the second relay device 103D operates as the so-called bridge in the first relay mode, and operates as the router to the second provider network 620 in the second relay mode. In the relay mode storing section 310D as well, the following contents (hot illustrated) are set as common settings to the first relay mode and the second relay mode. That is: (1) the first port P1 in FIG. 12 is the outside network port, and the second provider network 620 is connected to; (2) the second port P2 is the internal network port; and (3) a wireless network 700 D with which the second relay device 103D establishes connection is included in the internal network.

Further, in this embodiment, even if the second relay device 103D is operating as the router, the status of the communication path between the first relay device 103C and the first provider network 610 can be checked preferably. Accordingly, the link integrity checking may be set such that, the first port P1 is used instead of the second port P2, and the relay device 103C may be set as the target host whose link integrity is to be checked.

Figure 17:
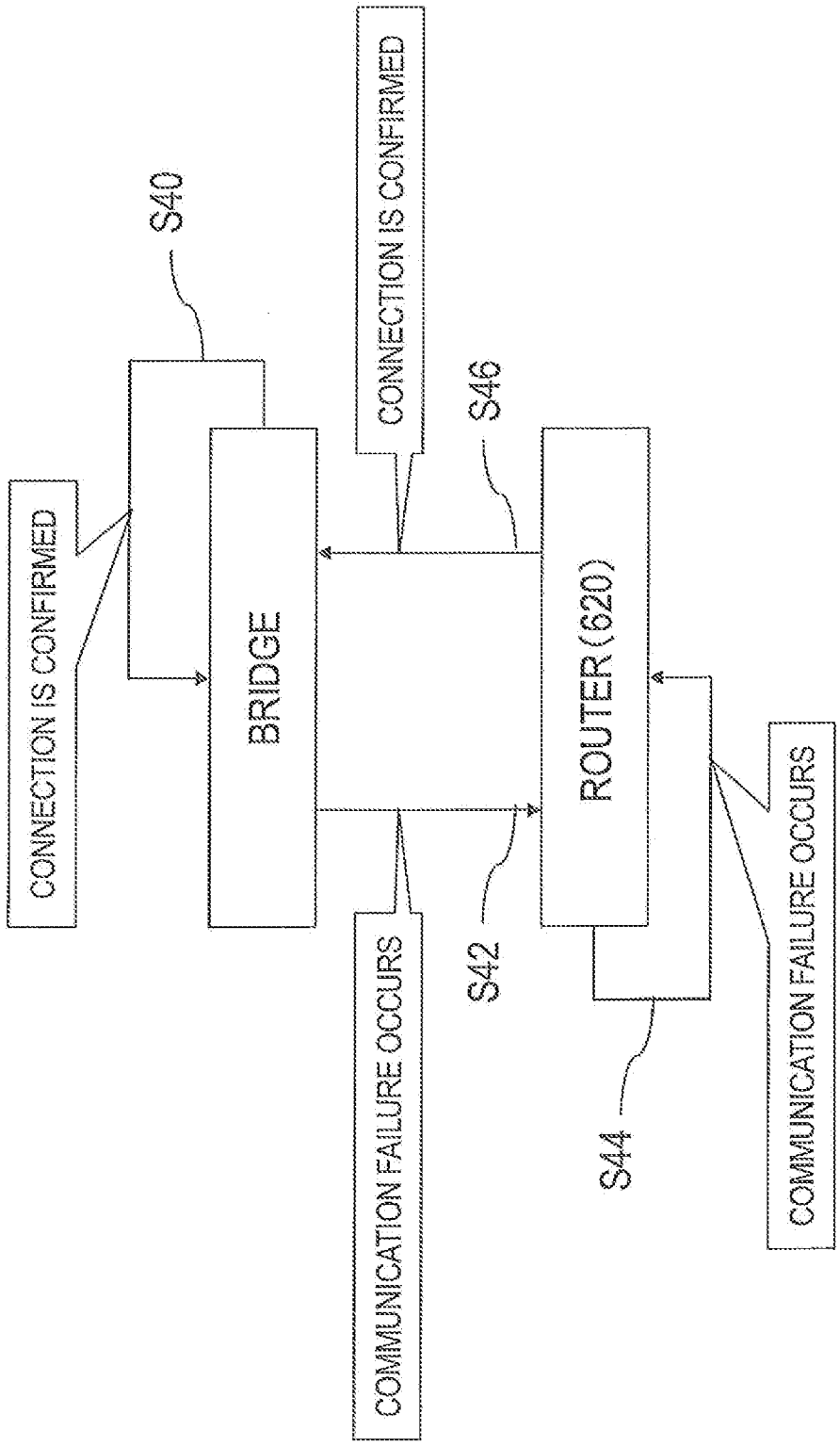
FIG. 17 is a state; transition diagram illustrating transition between a first relay mode and a second relay mode of the second relay device.

FIG. 17 is a state transition diagram indicating transition between the first relay mode and the second relay mode of the second relay device 103D. The bridge function and the router function of the second relay device 103D are set oppositely to those in the state transition diagram of the first relay device 103C. In the case of no communication failure, the bridge function (first mode) is enabled (step S40), whereas in the case of communication failure, the router function (second mode) is enabled (step S42). While the communication failure is not solved, the router function (second mode) is enabled (step S44). When the communication failure, is solved, the router function (second mode) is disenabled, and the bridge function (first mode) is enabled (step S46).

FIG. 18 is a flowchart showing a flow of operations of the relay devices 103C and 103D in this embodiment. To begin with, the operation of the first relay device 103C will be described. The communication failure determination section 240 checks connection with the gateway 612, and thereby determines whether there is a communication failure in the first, provider network 610 (step S100Ce). If it is determined that there is no communication failure (NO in step S100Ce), the relay mode controlling section 220 enables the first relay mode (router function) (step S110Ce). The communication control section 230C performs communication control based on the first relay mode (step S120Ce).

The permissible connection determination section 232 performs the permissible connection determination in accordance with a predetermined setting (not illustrated) (step S130Ce). When the connection is permitted (YES in step S140Ce), the wireless network control section 231 performs communication to/from the wireless network 700C. The DHCP processing section 236 provides information such as an IP address to a station (e.g., station 702C) which is newly connected to the internal network 810. The routing processing section 234 performs communication relay (performs routing) using the first port P1. Accordingly, the station (e.g., station 702C) connected to the first relay device 103C can communicate with the outside network 900 via the first relay device 103C and the first provider network 610 (step S200Ce). If the connection is not permitted (NO in step S140Ce), the station (e.g., station 702C) cannot access the outside network 900 (step S500Ce).

Next, an operation of the second relay device 103D will be described. The communication failure determination section 240 checks connection with the gateway 612 via the first relay device 103C, and determines whether there is a communication failure (step S100De). If it is determined that there is no communication failure (No in step S100De), the relay mode controlling section 220 enables the first relay mode (bridge function) (step S110De). Step S110De is different from step S110Ce in that functions enabled in the respective steps are different from each other. The communication control section 230D controls communication relay based on the first relay mode (S120De).

The permissible connection determination section 232 performs permissible connection determination in accordance with a predetermined setting (not illustrated) (step S130De). When the connection is permitted (YES in step S140De); the wireless network control section 231 performs communication to/from the wireless network 700C. The bridging processing section 235 relays communication using the second port P2 (performs bridging). The function of the DHCP processing section 236 of the second relay device 103D is disenabled. The DHCP processing section 236 of the first relay device 103C provides information such as an IP address to a station (e.g., station 702D) which is newly connected to the second relay device 100D. Accordingly, the station (e.g., station 702D) connected to the second relay device 103C can communicate with the outside network 900 via the second relay device 103D, the first relay device 103C, and the first provider network 610 (step S200De). If the connection is not permitted (NO in step S140De), the station (e.g., station 702D) cannot access the outside network 900 (step S500De).

Description will now be made of an operation of the first relay device 103C when a communication failure has occurred in the communication fine connecting the first relay device 103C and the first provider network 610 (YES in step S100Ce). In this case, the first relay device 103C enables the second relay mode (bridge function) (step S110Cf). Operations of the first relay device 103C from steps S120Cf to S500Cf are the same as those from steps S120De to S500De, and detailed description thereof will be omitted. Accordingly, in the same manner as the second relay device 103D, in the case of no communication failure in the network 610, the first relay device 103C operates as a bridge.

Next, description will be made of an operation of the second relay device 103D when a communication failure has occurred in the communication line connecting the second relay device 103D and the first provider network 610 (YES in step S100De). In this case, the second relay device 103D enables the second relay mode (router function) (step S110Df). Operations of the second relay device 103D from steps S120Df to S500Df are the same as those from steps S120Ce to S500Ce, and detailed description thereof will be omitted. Accordingly, in the same manner as the first relay device 103C, in the case of no communication failure in the first provider network 610, the second relay device 103D operates as a router.

As described above, when there is no communication failure in the path connecting the first relay device 103C and the first provider network 610, the first relay device 103C connected to the first provider network 610 operates as the router, and the second relay device 103D connected to the first relay device 103C operates as the bridge. Accordingly, the station connected to the first relay device 103C or the second relay device 103D can communicate with the outside network 900 via the first provider network 610. In the case of communication failure, the first relay device 103C operates as the bridge, and the second relay device 103D connected to the second provider network 620 operates as the router. Accordingly, the station connected to the first relay device 103C or the second relay device 103D can communicate with the outside network 900 via the second provider network 620. As described above, regardless of whether there is a communication failure, communication relay by the relay device 103C or 103D can be performed. Accordingly, the possibility of communication trouble can be reduced.

Further, the operations according to this embodiment will not cause inconsistency of the routing tables of the respective relay devices 103C and 103D. If two of the relay devices 103C and 103D simultaneously operate as routers, for the sake of appropriate communication by two routers 103C and 103D, the routers 103C and 103D exchange routing information to ensure the consistency in the routing tables of the routers 103C and 103D. Meanwhile, in this embodiment, if either one of the relay devices 103C and 103D operates as the router, the other relay device operates as a bridge instead of a router. The routing processing section 234 of either one of the first relay device 103C or the second relay device 103D generates the routing table. Thus, even if the routing information is not exchanged between the routers 103C and 103D, inconsistency will not occur between the routing table of the first relay device 103C and the routing table of the second relay device 103D. The routing processing sections 234 of the relay devices 103C and 103D may automatically generate the routing tables, respectively, in accordance with the information received from the respective provider networks 610 and 620. Alternatively, as in the modification of the first embodiment, the relay mode setting section 210 may generate the routing table in accordance with an instruction by the user.

Further, in this embodiment, when the relay device 103C or 103D operates as the router, the relay device 103C or 103D also realizes the function of address allocation based on the DHCP. Accordingly, the station connected to the relay device 103C and 103D can perform communication appropriately using network addresses allocated thereto. In addition, in this embodiment, when the relay device 103C or 103D operates as the bridge, the relay device 103C or 103D disenables the function of the address allocation. Accordingly, flexible communication suitable for control by different relay devices can be realized. For example, in step S200Ce, the first relay device 103C performs the address allocation, and concurrently, in step S200De, the second relay device 103D operates as the bridge. Thus, the second relay device 103D does not perform the address allocation. Accordingly, when a station (e.g., station 702D) is newly connected to the second relay device 103D, an address is allocated to the station by the other relay device, that is, the relay device 103C, instead of the second relay device 103D. If the second relay device 103D in addition to the first relay device 103C performs the address allocation, the addresses allocated by the relay devices 103C and 103D may conflict with each other. According to this embodiment, the possibility of such conflict can be minimized.

The target of the link integrity checking may be a route including at least a part of the communication path connecting the communication interface 510 of the first relay device 103C and the first provider network 610. In this case as well, if it is determined that a communication failure has occurred, there is a possibility that the first relay device 103C cannot access the first provider network 610. Thus, by switching the relay modes, the first relay device. 103G can perform communication relay appropriately depending on whether there is a communication failure.

There may be a case where the IP address of the first port P1 of the first relay device 103C is dynamically allocated by the first provider network 610 (e.g., an address is allocated based on the DHCP). In this case, when communication between the first relay device 103C and the first provider network 610 is disconnected, the IP address allocated to the first port P1 becomes invalid. Thus, the IP address of the first port P1 of the first relay device 103C may be set as the target whose link integrity is to be checked. When the allocation of the IP address becomes invalid, even if the station connected to the first port P1 transmits a packet destined to the IP address, the first port P1 cannot receive the packet transmitted to the IP address. Thus, by setting the IP address of the first port P1 as the target, it is possible to determine whether a communication failure has occurred in the route connecting the communication interface 510 of the first relay device 103C and the first provider network 610. In this case as well, the communication path whose link integrity is to be checked includes a part of the route which connects the communication interface 510 and the first provider network 610 (the port of the communication interface 510).

Further, the relay devices 103C and 103D may operate as repeaters instead of operating as bridges.

It should be noted that, of the components described in the first to third embodiments, those components other, than the components that are claimed in the independent claims are additional elements and can be omitted optionally. Further, the present invention is not limited to the above-described embodiments and modification, but can be realized in various forms without departing from the scope and spirit of the present invention. For example, the following modifications may be possible.

In the above respective embodiments, various items can be adopted as the items stored by the relay mode storing section 310. For example, only some of the items shown in FIG. 3, FIG. 9, FIG. 14, and FIG. 16 may be stored. For example, in FIG. 3, any of the items of the "SSID", "VLAN", and "security method" may be omitted. Further, in FIG. 9, the item of the "VLAN" may be omitted. Further, in FIGS. 14 and 16, the item of the "DHCP" may be, omitted. Further, in the respective embodiments, other items may be added. For example, in FIG. 9, some of the items shown in FIG. 3 may be added. Similarly, In FIGS. 14 and 16, some of the items shown in FIG. 3 may be added. Further, the contents of each item to be set are not limited to those described in the first to third embodiments, and various contents may be adopted. For example, in FIG. 3, the VLAN of the first relay mode may be a VLAN that specifies a network different from the internal network 800 in FIG. 1, and the VLAN of the second relay mode may be a VLAN that specifies a network different from the outside network 900. More specifically, the VLAN of the second relay mode which does not use the quarantine may identify a specific network which is connectable by a station that is not subjected to quarantine. Further, a single VLAN (e.g., VLAN1) may be associated with two SSIDs (SSID1 and SSID2). Further, a single security method may be associated with two SSIDs (SSID1 and SSID2).

In addition, in the respective embodiments, a single relay device may operate as any of the relay devices 100, 101, 102A, 102B, 103C, and 103D of the respective embodiments, depending on the settings. In this case, for example, the user interface 400 according to the modification of the first embodiment may be used for setting upon reception of an instruction for various settings from the user. For example, when the user, interface 400 obtains an instruction for settings as shown in FIG. 3, the relay device sets the communication parameters shown in FIG. 3. Accordingly, the relay device operates as shown in FIG. 5. For example, if the user interface 400 obtains an instruction for settings as shown in FIG. 14, the relay device sets the communication parameters shown in FIG. 14. Accordingly, the relay device operates as shown in steps S100Ce to S500Ce, or in steps S110*cf* to S500Cf in FIG. 18.

Further, the relay device may select the setting of a relay mode to be used actually upon reception of an instruction of the user who has selected a specific relay mode from among a plurality of relay modes preliminarily set by the user interface 400.

Further, the relay mode setting section 210 may perform various settings without using an instruction by the user. For example, the relay mode setting section 210 may automatically download the setting via the network from a server providing various settings.

Further, in the respective embodiments, it may be set such that the relay mode controlling section 220 does not automatically switch from the second relay mode to the first relay mode. For example, the relay mode controlling section 220 may switch from the second, relay mode to the first relay mode when an instruction is obtained from the user who has confirmed that the communication failure is solved.

Further, in the respective embodiments, the configuration of the relay device is not limited to that illustrated in FIG. 2, but various configurations may be adopted. For example, the communication interface 510 may be an interface for power line communication (PLC) instead of the interface compliant with the IEEE802.3. Further, the communication interface 510 may be an interface for wireless communication instead of an interface for wired communication. Further, the communication interface 510 may be divided into an interface for an outside network and an interface for an internal network. Further, the configuration, of the network system is not limited to those configurations in the respective embodiments, but various alternative configurations may be adopted. For example, in FIG. 1, the authentication server 802 may be connected to a communication path (not illustrated) other than the communication path including the internal network 800. In this case, the relay device 100 may access the authentication server 802 via the other communication path, and perform communication relay without using the other communication path.

Further, in the first embodiment and third embodiment, the interface for wireless communication (e.g., wireless interface 500 in FIG. 2) may be omitted. In this case, the permissible connection determination section 232 determines, whether communication relay between a communication device connected to an interface for wired communication (e.g., communication interface 510) and a network (more specifically, another communication device, including a server or relay device, connected to the network) is permissible. When the communication connection is permitted, the communication control section (e.g., permissible connection determination section 232 in FIG. 2, routing processing section 234 and bridging processing section 235 in FIG. 13) executes the relay. The communication control section (e.g., communication control section 230 in FIG. 2 and communication control section 230C in FIG. 13) controls the relay based on the enabled relay mode.

Further, in the first to third embodiments, the interface for wired communication (e.g., communication interface 510 in FIG. 2) may be omitted. In this case, the permissible connection determination section 232 determines whether communication relay between a station connected to an interface for wireless communication (e.g., wireless interface 500) and a network (more specifically, another communication device, including a server or a relay device, connected to the network) is permissible. When the communication connection is permitted, the communication control section (e.g., the permissible connection determination section 232 in FIGS. 2 and 8, the routing processing section 234 and bridging processing section 235 in FIG. 13) executes the relay. The communication control section (e.g., the communication control section 230 in FIG. 2, the communication control section 230A in FIG. 8, and the communication control section 230C in FIG. 13) controls the relay based on the enabled relay mode.

In this manner, the communication path interface for connection with a plurality of communication paths may be configured by using both the wired communication interface and the wireless communication interface. The communication path interface may be configured by using only the wired communication interface without using the wireless communication interface. Further, the communication path interface may be configured by using only the wireless communication interface without using the wired communication interface.

The communication failure determination section, the relay mode controlling section, the communication control section, the relay mode setting section, and the user interface in the first to third embodiments and the modification are typically realized by a CPU extracting programs such as firmware stored in a flash ROM or a ROM onto a RAM, and executing the programs. Further, the relay mode storing section is realized by a storage device such as a ROM and a RAM.

In the respective embodiments, some of the configurations which are realized by hardware may be realized by software. Conversely, all or some of the components that are realized by software may be realized by hardware. For example, functional blocks of the communication failure determination section, the relay mode controlling section, the communication control section, the relay mode setting section, and the user interface may be each realized as an LSI, i.e., an integrated circuit. These functional blocks may be individually realized as chips, or some or all of the functional blocks may be realized as a chip. The LSI may be alternatively referred to as an IC, a system LSI, a super LSI, an ultra LSI depending on the degree of integration. The method of integration is not limited to the LSI, but a dedicated circuit or a general purpose processor may be applied. Alternatively, a Field Programmable Gate Array (FPGA), which is programmable after manufacture of the LSI, or a reconfigurable processor, which can reconfigure connection or setting of circuit cells inside the LSI, may be used.

Further, if some or all of the functions of the present invention are realized by software, the software (computer programs) can be provided in a form of a computer-readable storage medium. In the present invention, the "computer-readable storage medium" represents not only a portable storage medium such as a flexible disks and CD-ROMs, but also various internal storage units in computers such as RAMs and ROMs, and external storage units fitted to computers such as hard disks.

What is claimed is:

1. A relay device for performing wireless communication with a wireless communication device to relay communication between the wireless communication device and another communication device, the relay device comprising:
    a communication interface connectable to at least two communication paths, the at least two communication paths including a first communication path and a second communication path;
    a wireless interface for wireless communication between the wireless communication device and the relay device;
    a relay mode storing section for storing a first relay mode which includes a first set of communication parameters for relaying, via the first communication path, the communication using the communication interface, and a second relay mode which includes a second set of communication parameters for relaying, via the second communication path which is different from the first communication path, using the communication interface;
    a communication failure determination section for determining whether there is a communication failure in the first communication path;
    a relay mode controlling section for enabling the first relay mode and disenabling the second relay mode when the communication failure determination section determines that there is no communication failure in the first communication path, and disenabling the first relay mode and enabling the second relay mode when the communication failure determination section determines that there is a communication failure occur in the first communication path; and
    a communication control section for controlling the communication based on either the first relay mode or the second relay mode that is enabled by the relay mode controlling section, wherein
    the first communication path includes a communication path leading to a determination server which performs permissible connection determination of whether the relay to the wireless communication device is permissible,
    the first relay mode includes, as one of the first set of communication parameters, a setting for enabling the permissible connection determination by the determination server,
    the second relay mode includes as one of the second set of communication parameters, a setting for enabling the permissible connection determination by the relay device; and
    the communication control section includes a permissible connection determination section for inquiring of the determination server and for performing the permissible connection determination based on a result of the inquiry when the first relay mode is enabled, and for performing the permissible connection determination singly when the second relay mode is enabled.

2. The relay device according to claim 1, further comprising
    a relay mode setting section configured to set values specifying the first communication path and the second communication path and the first and second sets of communication parameters of the respective first relay mode and second relay modes, and to store the set values and the first and second sets of communication parameters in the relay mode storing section.

3. The relay device according to claim 1, wherein
    the first relay mode includes a first wireless identifier, as one of the first set of communication parameters, used for identifying a wireless network established by the wireless interface,
    the second relay mode includes a second wireless identifier, as one of the second set of communication parameters, which is different from the first wireless identifier;
    the communication control section includes:
        a wireless network control section for causing the wireless interface to establish communication with the wireless network identified by the first wireless identifier when the first relay mode is enabled, and for causing the wireless interface to establish communication with the wireless network identified by the second wireless identifier when the second relay mode is enabled.

4. The relay device according to claim 1, wherein
    in the second communication path, a subsequent relay device configured to relay the communication subsequently to the relay device is wirelessly connected to the relay device,
    the communication interface has a second wireless interface for the wireless communication,
    the communication control section includes a wireless relaying section which relays the communication without using the subsequent relay device when the first relay mode is enabled, and which relays the communication via the subsequent relay device when the second relay mode is enabled.

5. A relay device for performing wireless communication with a wireless communication device to relay communication between the wireless communication device and another communication device, the relay device comprising:
    a communication interface connectable to at least two communication paths, the at least two communication paths including a first communication path and a second communication path;
a wireless interface for wireless communication between the wireless communication device and the relay device;
a relay mode storing section for storing a first relay mode which includes a first set of communication parameters for relaying, via the first communication path, the communication using the communication interface, and a second relay mode which includes a second set of communication parameters for relaying, via the second communication path which is different from the first communication path, using the communication interface;
a communication failure determination section for determining whether there is a communication failure in the first communication path;
a relay mode controlling section for enabling the first relay mode and disenabling the second relay mode when the communication failure determination section determines that there is no communication failure in the first communication path, and disenabling the first relay mode and enabling the second relay mode when the communication failure determination section determines that there is a communication failure occur in the first communication path; and
a communication control section for controlling the communication based on either the first relay mode or the second relay mode that is enabled by the relay mode controlling section, wherein
the first relay mode and the second relay mode each include, as one of the respective first and second sets of communication parameters, a virtual network identifier for identifying a virtual network established using a communication line connected to the communication interface is configured to establish connection,
the virtual network identifier of the first relay mode is a first virtual network identifier for identifying a first virtual network including the first communication path,
the virtual network identifier of the second relay mode is a second virtual network identifier for identifying a second virtual network including the second communication path,
the communication control section is configured to perform the relay using the first virtual network when the first relay mode is enabled, and to perform the relay using the second virtual network when the second relay mode is enabled.

6. A relay device for performing wireless communication with a wireless communication device to relay communication between the wireless communication device and another communication device, the relay device comprising:
a communication interface connectable to at least two communication paths, the at least two communication paths including a first communication path and a second communication path;
a wireless interface for wireless communication between the wireless communication device and the relay device;
a relay mode storing section for storing a first relay mode which includes a first set of communication parameters for relaying, via the first communication path, the communication using the communication interface, and a second relay mode which includes a second set of communication parameters for relaying, via the second communication path which is different from the first communication path, using the communication interface;
a communication failure determination section for determining whether there is a communication failure in the first communication path;

a relay mode controlling section for enabling the first relay mode and disenabling the second relay mode when the communication failure determination section determines that there is no communication failure in the first communication path, and disenabling the first relay mode and enabling the second relay mode when the communication failure determination section determines that there is a communication failure occur in the first communication path; and
a communication control section for controlling the communication based on either the first relay mode or the second relay mode that is enabled by the relay mode controlling section, wherein
the communication control section is configured to perform the communication via the first communication path based on a network layer header of a communication frame, and perform the communication via the second communication path based on a data link layer header of the communication frame,
the first relay mode includes as one of the first set of communication parameters a setting for the communication based on the network layer header,
the second relay mode includes as one of the second set of communication parameters a setting for the communication based on the data link layer header.

7. The relay device according to claim 6, wherein
the first relay mode includes as one of the first set of communication parameters a setting for enabling address allocation in accordance with a dynamic host configuration protocol, and
the second relay mode includes as one of the second set of communication parameters a setting for disenabling the address allocation in accordance with the dynamic host configuration protocol.

8. A relay method for establishing wireless communication between a relay device and a wireless communication device and relaying communication between the wireless communication device and another communication device, the method comprising:
a first step of determining whether there is a communication failure in a first communication path;
a second step of enabling a first relay mode which includes a first set of communication parameters for relaying the communication via the first communication path and disenabling a second relay mode which includes a second set of communication parameters for relaying the communication via a second communication path which is different from the first communication path, when the first step determines that there is no communication failure in the first communication path, and disenabling the first relay mode and enabling the second relay mode when the first step determines that there is a communication failure in the first communication path; and
a third step of controlling the communication in accordance with either the first relay mode or the second relay mode that is enabled by the second step, wherein
the third step of controlling the communication includes
performing the communication via the first communication path based on a network layer header of a communication frame, and
performing the communication via the second communication path based on a data link layer header of the communication frame,
the first relay mode includes as one of the first set of communication parameters a setting for the communication based on the network layer header, and the second relay mode includes as one of the second set of communication parameters a setting for the communication based on the data link layer header.

9. A non-transitory computer readable storage medium having stored therein a program for causing a computer included in a relay device to execute a process of performing wireless communication with a wireless communication device and relaying communication between the wireless communication device and another communication device, the process comprising:

a first step of determining whether there is a communication failure in a first communication path;

a second step of enabling a first relay mode which includes a first set of communication parameters for relaying the communication via the first communication path and disenabling a second relay mode which includes a second set of communication parameters for relaying the communication via a second communication path which is different from the first communication path, when the first step determines that there is no communication failure in the first communication path, and disenabling the first relay mode and enabling the second relay mode when the first step determines that there is a communication failure in the first communication path; and a third step of controlling the communication in accordance with either the first relay mode or the second relay mode that is enabled by the second step, wherein the third step of controlling the communication includes performing the communication via the first communication path based on a network layer header of a communication frame, and performing the communication via the second communication path based on a data link layer header of the communication frame, the first relay mode includes as one of the first set of communication parameters a setting for the communication based on the network layer header, and the second relay mode includes as one of the second set of communication parameters a setting for the communication based on the data link layer header.

10. A non-transitory computer readable medium having instructions stored therein that when executed by a processor implement relay method using a relay device for performing wireless communication with a wireless communication device to relay communication between the wireless communication device and another communication device, the relay method comprising:

establishing a communication interface to at least two communication paths, the at least two communication paths including a first communication path and a second communication path;

establishing a wireless interface for wireless communication between the wireless communication device and the relay device;

storing in a relay mode storage section a first relay mode which includes a first set of communication parameters for relaying, via the first communication path, the communication using the communication interface, and a second relay mode which includes a second set of communication parameters for relaying, via a second communication path which is different from the first communication path, using the communication interface;

determining with a communication failure determination section whether there is a communication failure in the first communication path;

enabling with a relay mode controlling section the first relay mode and disenabling the second relay mode when the communication failure determination section determines that there is no communication failure in the first communication path, and disenabling the first relay mode and enabling the second relay mode when the communication failure determination section determines that there is a communication failure occur in the first communication path; and controlling with a communication control section the communication based on either the first relay mode or the second relay mode that is enabled by the relay mode controlling section, wherein the first communication path includes a communication path leading to a determination server which performs permissible connection determination of whether the relay to the wireless communication device is permissible, the first relay mode includes, as one of the first set of communication parameters, a setting for enabling the permissible connection determination by the determination server, the second relay mode includes as one of the second set of communication parameters, a setting for enabling the permissible connection determination by the relay device; and the communication control section includes a permissible connection determination section for inquiring of the determination server and for performing the permissible connection determination based on a result of the inquiry when the first relay mode is enabled, and for performing the permissible connection determination singly when the second relay mode is enabled.

11. A non-transitory computer readable medium having instructions stored therein that when executed by a processor implement relay method using a relay device for performing wireless communication with a wireless communication device to relay communication between the wireless communication device and another communication device, the relay method comprising:

establishing a communication interface to at least two communication paths, the at least two communication paths including a first communication path and a second communication path;

establishing a wireless interface for wireless communication between the wireless communication device and the relay device;

storing in a relay mode storing section a first relay mode which includes a first set of communication parameters for relaying, via the first communication path, the communication using the communication interface, and a second relay mode which includes a second set of communication parameters for relaying, via the second communication path which is different from the first communication path, using the communication interface;

determining with a communication failure determination section whether there is a communication failure in the first communication path;

enabling with a relay mode controlling section the first relay mode and disenabling the second relay mode when the communication failure determination section determines that there is no communication failure in the first communication path, and disenabling the first relay mode and enabling the second relay mode when the communication failure determination section determines that there is a communication failure occur in the first communication path; and controlling with a communication control section the communication based on either the first relay mode or the second relay mode that is enabled by the relay mode controlling section, wherein the first relay mode and the second relay mode each include, as one of the respective first and second sets of communication parameters, a virtual network identifier for identifying a virtual network established using a communication line connected to the communication interface is configured to establish connection, the virtual network identifier of the first relay mode is a first virtual network identifier for identifying a first virtual network including the first communication path, the virtual network identifier of the second relay mode is a second virtual network identifier for identifying a second virtual network including the second communication path, the communication control section is configured to perform the relay using the first virtual network when the first relay mode is enabled, and to perform the relay using the second virtual network when the second relay mode is enabled.

* * * * *